(12) United States Patent
Wang et al.

(10) Patent No.: US 11,792,381 B2
(45) Date of Patent: Oct. 17, 2023

(54) PHASE-SENSITIVE COMPRESSED ULTRAFAST PHOTOGRAPHY SYSTEMS AND METHODS

(71) Applicant: California Institute of Technology, Pasadena, CA (US)

(72) Inventors: Lihong Wang, Arcadia, CA (US); Taewoo Kim, Alhambra, CA (US); Jinyang Liang, Varennes (CA); Liren Zhu, Sunnyvale, CA (US)

(73) Assignee: California Institute of Technology, Pasadena, CA (US)

( * ) Notice: Subject to any disclaimer, the term of this patent is extended or adjusted under 35 U.S.C. 154(b) by 758 days.

(21) Appl. No.: 16/806,691

(22) Filed: Mar. 2, 2020

(65) Prior Publication Data

US 2022/0247908 A1    Aug. 4, 2022

Related U.S. Application Data

(60) Provisional application No. 62/812,411, filed on Mar. 1, 2019.

(51) Int. Cl.
*H04N 13/161* (2018.01)
*H04N 13/25* (2018.01)
(Continued)

(52) U.S. Cl.
CPC ......... *H04N 13/161* (2018.05); *G01S 7/4814* (2013.01); *G01S 7/4865* (2013.01);
(Continued)

(58) Field of Classification Search
CPC ........ G02B 5/04; G02B 21/10; H04N 13/161; H04N 13/254; H04N 13/25;
(Continued)

(56) References Cited

U.S. PATENT DOCUMENTS 7,859,679 B2   12/2010   Bouma et al.
9,645,377 B2    5/2017   Bosworth et al.
(Continued)

OTHER PUBLICATIONS

L. Fan; X. Yan; H. Wang; L. V. Wang; "Real-time observation and control of optical chaos," Science Advances 7(3) eabc8448 (2021).
(Continued)

*Primary Examiner* — William R Alexander
*Assistant Examiner* — Sharrief I Broome
(74) *Attorney, Agent, or Firm* — Weaver Austin Villeneuve & Sampson LLP

(57) ABSTRACT

Disclosed herein are systems and methods of phase-sensitive compressed ultrafast photography (pCUP). In some embodiments, a pCUP system comprises: a dark-field imaging system, and a compressed ultrafast photography (CUP system). The dark-field imaging system may comprise a laser source configured to illuminate the subject with a laser pulse; and a beam block configured to pass laser light scattered by the subject as a first series of phase images and block laser light not scattered by the subject. The CUP system may comprise: a spatial encoding module configured to receive the first series of phase images and to produce a second series of spatially encoded phase images; and a streak camera configured to receive the second series of spatially encoded phase images, to deflect each spatially encoded phase image by a temporal deflection distance, and to integrate the deflected phase images into a single raw CUP image.

10 Claims, 7 Drawing Sheets

(51) Int. Cl.
| | |
|---|---|
| *H04N 13/254* | (2018.01) |
| *H04N 13/282* | (2018.01) |
| *G01S 7/481* | (2006.01) |
| *G01S 7/4865* | (2020.01) |
| *G01S 17/894* | (2020.01) |
| *H04N 23/72* | (2023.01) |
| *G02B 5/04* | (2006.01) |
| *G01J 11/00* | (2006.01) |
| *G01J 9/00* | (2006.01) |
| *G02B 21/10* | (2006.01) |

(52) U.S. Cl.
CPC ............ *G01S 17/894* (2020.01); *H04N 13/25* (2018.05); *H04N 13/254* (2018.05); *H04N 13/282* (2018.05); *H04N 23/72* (2023.01); *G01J 9/00* (2013.01); *G01J 2011/005* (2013.01); *G02B 5/04* (2013.01); *G02B 21/10* (2013.01)

(58) Field of Classification Search
CPC .. H04N 13/2582; H04N 23/72; G01S 17/894; G01S 7/4814; G01S 7/4865; G01J 9/00; G01J 2011/005
See application file for complete search history.

(56) References Cited

U.S. PATENT DOCUMENTS

| | | | |
|---|---|---|---|
| 10,473,916 B2 | 11/2019 | Wang et al. | |
| 10,992,924 B2 | 4/2021 | Wang et al. | |
| 2001/0017727 A1* | 8/2001 | Sucha | G01N 21/4795 |
| | | | 359/333 |
| 2011/0260036 A1 | 10/2011 | Baraniuk et al. | |
| 2013/0046175 A1 | 2/2013 | Sumi | |
| 2016/0157828 A1 | 6/2016 | Sumi et al. | |
| 2017/0163971 A1* | 6/2017 | Wang | G02B 26/0833 |
| 2018/0224552 A1 | 8/2018 | Wang et al. | |
| 2020/0288110 A1* | 9/2020 | Wang | H04N 13/218 |
| 2021/0088384 A1* | 3/2021 | Wang | H04N 19/593 |

OTHER PUBLICATIONS

Notice of Allowance dated May 19, 2022 issued in U.S. Appl. No. 17/030,056.
U.S. Notice of Allowance dated Sep. 8, 2022 in U.S. Appl. No. 17/030,056.
Notice of Allowance dated Sep. 23, 2020 issued in U.S. Appl. No. 16/810,630.
Notice of Allowance dated Dec. 15, 2020 issued in U.S. Appl. No. 16/810,630.
Aghababaei Nejad, et al., "Polarization investigation of laser-induced breakdown plasma emission from Al, Cu, Mo, W, and Pb elements using nongated detector," J. Laser Appl. 30, 022005 (2018).
Astapenko, V., et al., "Polarization mechanism for bremsstrahlung and radiative recombination in a plasma with heavy ions," Plasma Phys. Rep. vol. 28, No. 4, (2002) pp. 303-311.
Baker, et al., High resolution imaging of photosynthetic activities of tissues, cells and chloroplasts in leaves, J. Exp. Bot. 52, 615-621 (2001).
Balistreri, et al., "Tracking Femtosecond Laser Pulses in Space and Time" Science 294, 1080-1082 (2001).
Barty, A. et al. "Ultrafast single-shot diffraction imaging of nanoscale dynamics" Nature Photonics 2, 415-419 (2008).
Batabyal, S. et al. "Label-free optical detection of action potential in mammalian neurons," Biomedical Optics Express 8, (2017) pp. 3700-3713.
Bergmann, et al., "Multiwavelength fluorescence lifetime imaging by TCSPC" Proc. SPIE, Advanced Photon Counting Techniques, vol. 6372, (2006) pp. 637204-1-637204-6.

Berezin, et al., "Fluorescence Lifetime Measurements and Biological Imaging" Chemical Reviews 110, pp. 2641-2684 (2010).
Bindhu, S. et al., "Measurement of the absolute fluorescence quantum yield of rhodamine B solution using a dual-beam thermal lens technique," Journal of Physics D: Applied Physics 29, (1996) pp. 1074-1079.
"Bioucas-Dias, et al., ""A new TwIST: two-step iterative shrinkage/thresholding algorithms for image restoration,"" IEEE Trans. Image Process. 16, 2992-3004 (2007)".
"Bonse, J., et al., ""Time-and space-resolved dynamics of melting, ablation, and solidification phenomena induced by femtosecond laser pulses in germanium,"" Phys. Rev. B 74, 134106 (2006)".
Bosworth, B. T. et al., "High-speed flow microscopy using compressed sensing with ultrafast laser pulses," Opt. Express 23, 10521-10532 (2015).
Bowlan, P., et al., "Measuring the spatiotemporal electric field of tightly focused ultrashort pulses with sub-micron spatial resolution" Optics Express 16, 13663-13675 (2008).
Bradley, et al. "High-speed gated x-ray imaging for ICF target experiments (invited)" Review of Scientific Instruments 63(10), Oct. 1992, pp. 4813-4817.
Brennen, C.E., "Cavitation and Bubble Dynamics" California Institute of Technology, Oxford University Press, (1995) pp. 1-294.
Brenner, et al., "Single-bubble sonoluminescence," Rev. Mod. Phys. 74,425 (2002).
Brinks, D., Klein, A. J. & Cohen, A. E., "Two-photon lifetime imaging of voltage indicating proteins as a probe of absolute membrane voltage," Biophys. J. 109, 914-921 (2015).
Bub, G., et al., "Temporal pixel multiplexing for simultaneous high-speed, high-resolution imaging," Nat. Methods 7,209 (2010).
Byun, et al., "A Model of Laser-Induced Cavitation" Japanese Journal of Applied Physics 43, (2004) pp. 621-630.
Cadby, A., et al., "Mapping the Fluorescence Decay Lifetime of a Conjugated Polymer in a Phase-Separated Blend Using a Scanning Near-Field Optical Microscope" Nano Letters vol. 5, No. 11, (2005) pp. 2232-2237.
Campbell, J.B. & Wynne, R.H., "Introduction to Remote Sensing," Fifth Edition, Guilford Press (2011) pp. 1-23. [ISBN 978-1-60918-176-5].
Candes, E. J., "The restricted isometry property and its implications for compressed sensing," C.R. Math. 346, 589-592 (2008).
Chang, D. E., "Quantum nonlinear optics—photon by photon" Nature Photonics 8, 685-694 (2014).
Chen, M., et al., "3D differential phase contrast microscopy" Biomedical Optics Express 7, (2016) pp. 3940-3950.
Choi, W. et al. "Tomographic phase microscopy" Nature Methods 4, 717 (2007) pp. 1-3.
Corsi, M. et al., "Temporal and spatial evolution of a laser-induced plasma from a steel target," Appl. Spectrosc. 57, 715-721 (2003).
Cotte, Y. et al. "Marker-free phase nanoscopy" Nature Photonics 7, 113 (2013) pp. 1-5.
Davis, T. J., et al., "Phase-contrast imaging of weakly absorbing materials using hard X-rays," Nature 373, pp. 595-598 (1995).
De Giacomo, et al., "Laser-induced plasma emission: from atomic to molecular spectra" J. Phys. D: Appl. Phys. 50 (2017) 183002 (17pp).
De Lucia Jr, F. C., et al., Current status of standoff LIBS security applications at the United States Army Research Laboratory (2009).
Dikmelik, et al., "Femtosecond and nanosecond laser-induced breakdown spectroscopy of trinitrotoluene," Opt. Express 16, 5332-5337 (2008).
Ehn, A. et al., "FRAME: femtosecond videography for atomic and molecular dynamics," Light Sci Appl. 6, el 7045 (2017).
El-Desouki, M. et al. "CMOS Image Sensors for High Speed Applications" Sensors 9, 430-444 (2009).
Etoh, G. T. et al. "The Theoretical Highest Frame Rate of Silicon Image Sensors" Sensors 17, 483 (2017).
Farber, et al., "Compressive 4D spectra-volumetric imaging," Optics Letters vol. 41, No. 22, Nov. 15, 2016, pp. 5174-5177.
Ferraro, J. R., "Introductory Raman spectroscopy, 2nd Ed." Academic press (2003) pp. 1-195. <ISBN:978-0-12-254105-6> [Part I].

(56) References Cited

OTHER PUBLICATIONS

Ferraro, J. R., "Introductory Raman spectroscopy, 2nd Ed." Academic press (2003) pp. 196-434. <ISBN:978-0-12-254105-6> [Part 2].
Fuller, P. "An introduction to high-speed photography and photonics," Imaging Sci. J. 57, 293-302 (2009).
Gabolde, et al., "Single-frame measurement of the complete spatiotemporal intensity and phase of ultrashort laser pulses using wavelength-multiplexed digital holography" The Journal of the Optical Society of America B 25, (2008) pp. A25-A33.
Gabolde, et al., "Single-shot measurement of the full spatiotemporal field of ultrashort pulses with multi-spectral digital holography" Optics Express 14, 11460-11467 (2006).
Gage, S. H. "Modern dark-field microscopy and the history of its development" Transactions of the American Microscopical Society vol. 39, No. 2, Apr. 1920, pp. 95-141.
Gao, et al., "A review of snapshot multidimensional optical imaging: measuring photon tags in parallel" Phys Rep. Feb. 29, 2016; 616, pp. 1-37. <doi:10.1016/j.physrep.2015.12.004>.
Gao, et al., "Single-shot compressed ultrafast photography at one hundred billion frames per second," Nature 516(7529) 74-77 (2014).
Gao, G. et al., "Ultrafast all-optical solid-state framing camera with picosecond temporal resolution," Opt. Express 25, 8721-8729 (2017).
Gao, L., "Compact Image Slicing Spectrometer (ISS) for hyperspectral fluorescence microscopy," Opt. Express 17, 12293-12308 (2009).
Gorkic, et al., "Analysis of sonic waves generated during laser engraving of printed circuits," Int. J. Adv. Manuf. Technol. 42, 138-144 (2009).
Gosta, M. & Grgic, M., "Accomplishments and challenges of computer stereo vision," 52nd Intl. Symp. ELMAR-2010, Sep. 15-17, 2010, Zadar, Croatia, pp. 57-64.
Gruev, et al., "Dual-tier thin film polymer polarization imaging sensor," Opt. Express 18, 19292-19303 (2010).
Gruev, V., et al., "CCD polarization imaging sensor with aluminum nanowire optical filters," Opt. 13 Express 18, pp. 19087-19094 (2010).
Hamamatsu Photonics K.K. "Guide to Streak Cameras" Hamamatsu Corp., Hamamatsu City, Japan, 2008, pp. 1-12. <www.hamamatsu.com>.
Hawking, S. W. "Gravitational Radiation from Colliding Black Holes" Physical Review Letters 26, (1971) pp. 1344-1346.
Heikkila, J. & Silven, 0., "A four-step camera calibration procedure with implicit image correction," Proceedings of IEEE Computer Society Conference on Computer Vision and Pattern Recognition, 1106-1112 (1997).
Herink, G., et al., "Real-time spectral interferometry probes the internal dynamics of femtosecond soliton molecules" Science 356, 50-54 (2017).
Heist, S., et al., "High-speed 3D shape measurement by GOBO projection of aperiodic sinusoidal fringes: a performance analysis," Proc. SPIE 10667-106670A (2018).
Heshmat, et al., "Single-shot ultrafast imaging using parallax-free alignment with a tilted lenslet array," CLEO: 2014 STu3E.7 (2014).
Hirschmuller, H., "Accurate and efficient stereo processing by semi-global matching and mutual information," 2005 IEEE Computer Society Conference on Computer Vision and Pattern Recognition (CVPR'05) 807-814 (2005).
Hirschmuller, H., "Stereo processing by semiglobal matching and mutual information," IEEE Trans. Pattern Anal. Mach. Intell. 30, 328-341 (2008).
Hori, et al., "Laser-Induced Breakdown Plasma Observed using a Streak Camera," Jpn. J. Appl. Phys. 47, 4759 (2008).
Horstmeyer, et al., "Diffraction tomography with Fourier ptychography" Optica 3, (2016) pp. 827-835.
Hunt, J. et al., "Metamaterial Apertures for Computational Imaging," Science 339, 310-313 (2013).
Jagadeesh, G. et al. "Needleless vaccine delivery using micro-shock waves" Clinical and vaccine immunology : CVI 18, (2011) pp. 539-545.
Jiang, H. et al. "Quantitative 3D imaging of whole, unstained cells by using X-ray diffraction microscopy" Proceedings of the National Academy of Sciences 107, 11234-11239 (2010).
Jiang, X. et al. "Chaos-assisted broadband momentum transformation in optical microresonators" Science 358, 344-347 (2017).
Jing, J., et al., "Spatio-temporal-spectral imaging of non-repeatable dissipative soliton dynamics," Nature Communications 11(1) (2020), pp. 1-9.
Johnsen, S. et al., "Polarization vision seldom increases the sighting distance of silvery fish," Current Biology 26, R752-R754 (2016).
Jung, J. et al. "Label-free non-invasive quantitative measurement of lipid contents in individual microalgal cells using refractive index tomography," Scientific Reports 8, 6524 (2018) pp. 1-10.
Kakue, et al., "Digital Light-in-Flight Recording by Holography by Use of a Femtosecond Pulsed Laser" IEEE Journal of Selected Topics in Quantum Electronics vol. 18, No. 1, Jan./Feb. 2012, pp. 479-485.
Kandel, M. E. et al. "Three-dimensional intracellular transport in neuron bodies and neurites investigated by label-free dispersion-relation phase spectroscopy" Cytometry Part A 91, (2017) pp. 519-526.
Kim, et al., "Picosecond-resolution phase-sensitive imaging of transparent objects in a single shot," Science Advances 6(3) eaay6200 (2020).
Kim, G. et al. "Measurements of three-dimensional refractive index tomography and membrane deformability of live erythrocytes from Pelophylax nigromaculatus," Scientific Reports 8, 9192 (2018) pp. 1-8.
Kim, K. et al., "Tomographic active optical trapping of arbitrarily shaped objects by exploiting 3D refractive index maps," Nature Communications 8, 15340 (2017) pp. 1-8.
Kim, T. et al. White-light diffraction tomography of unlabelled live cells. Nature Photonics 8, 256 (2014) pp. 1-20.
Kodama, R. et al. "Fast heating of ultrahigh-density plasma as a step towards laser fusion ignition" Nature 412, (2001) pp. 798-802.
Kodama, R., et al., "Development of a two-dimensional space-resolved highspeed sampling camera," Rev. Sci. Instrum. 70, (1999) pp. 625-628.
Komatsu, et al. "Dependence of reconstructed image characteristics on the observation condition in light-in-flight recording by holography" The Journal of the Optical Society of America A, vol. 22, No. 8, Aug. 2005, pp. 1678-1682.
Lazaros, N., Sirakoulis, G. C. & Gasteratos, A., "Review of stereo vision algorithms: from software to hardware," Int. J. Optomechatronics 2, 435-462 (2008).
Le Blanc, et al., "Single-shot measurement of temporal phase shifts by frequency-domain holography" Optics Letters 25, (2000) pp. 764-766.
Leuthold, J., et al., "Nonlinear silicon photonics" Nature Photonics 4, (2010) pp. 535-544.
Li, Z. et al. "Single-Shot Visualization of Evolving Laser Wakefields Using an All-Optical Streak Camera," Physical Review Letters 113, (2014) pp. 0850011-085001-5.
Li, Z., et al., "Single-shot tomographic movies of evolving light-velocity objects," Nat. Commun. 5, 3085 (2014).
Liang et al., "Single-shot real-time video recording of a photonic Mach cone induced by a scattered light pulse" Science Advances, Jan. 20, 2017, vol. 3: e1601814, pp. 1-7.
Liang, et al., "Encrypted three-dimensional dynamic imaging using snapshot time-of-flight compressed ultrafast photography," Scientific Reports 5(15504) (2015) pp. 1-10.
Liang, et al., "Homogeneous one-dimensional optical lattice generation using a digital micromirror devicebased high-precision beam shaper," J Micro. Nanolithogr. MEMS MOEMS 11, 023002 (2012).
Liang, et al., "Single-shot real-time femtosecond imaging of temporal focusing," Light-Science & Applications 7(1) 42 (2018).
Liang, J. andWang, L. V., "Single-shot ultrafast optical imaging," Optica 5, 1113-1127 (2018).
Liang, J. et al., "Grayscale laser image formation using a programmable binary mask," Opt. Eng. 51, 108201 (2012).

(56) References Cited

OTHER PUBLICATIONS

Liang, J., et al., "Single-shot stereo-polarimetric compressed ultrafast photography for light-speed observation of high-dimensional optical transients with picosecond resolution," Nature Communications 11(1) 5252 (2020).
Liu, X., et al., "Singleshot compressed optical-streaking ultra-high-speed photography," Optics Letters 44, 1387-1390, (2019).
Liu, X., "Single-shot real-time sub-nanosecond electron imaging aided by compressed sensing: Analytical modeling and simulation" Micron 117, 47-54 (2019).
Llull, et al., "Coded aperture compressive temporal imaging," Optics Express 21, 10526-10545 (2013).
Lohse, et al., "Snapping shrimp make flashing bubbles" Nature 413, 477-478 (2001). <https://doi.org/10.1038/35097152>.
Lu, Y., "Compressed ultrafast spectral-temporal photography" Phys. Rev. Lett. 122, (2019) pp. 193904-1-193904-4.
Luo, Y. et al., "Talbot holographic illumination nonscanning (THIN) fluorescence microscopy," Laser Photonics Rev. 8, L71-L75 (2014).
Majd, et al., "Polarization resolved laser induced breakdown spectroscopy by single shot nanosecond pulsed Nd: Y AG laser," Opt. Laser Eng. 48, (2010) pp. 750-753.
Markiewicz-Keszycka, et al., "Laser-induced breakdown spectroscopy (LIBS) for food analysis: a review," Trends Food, Sci. Technol. 65, (2017) pp. 80-93.
Marquet, P. et al. "Digital holographic microscopy: a noninvasive contrast imaging technique allowing quantitative visualization of living cells with subwavelength axial accuracy," Optics Letters 30, pp. 468-470 (2005).
Marquet, P., et al. "Review of quantitative phase-digital holographic microscopy: promising novel imaging technique to resolve neuronal network activity and identify cellular biomarkers of psychiatric disorders" vol. 1 (SPIE, 2014) pp. 020901-1-020901-15.
Matlis, N. H. et al. "Snapshots of laser wakefields" Nature Physics 2, 749-753 (2006).
Medhi, B., et al., "Shock-wave imaging by density recovery from intensity measurements" Applied Optics vol. 57, No. 15, May 20, 2018, pp. 4297-4308.
Merritt, D., et al., "Dark Matter Spikes and Annihilation Radiation from the Galactic Center" Physical Review Letters 88, 191301 (2002).
Michel, A. P., "Applications of single-shot laser-induced breakdown spectroscopy," Spectrochim. Acta B 65, 185-191 (2010).
Mikami, H., Gao, L. & Goda, K., "Ultrafast optical imaging technology: principles and applications of emerging methods," Nanophotonics 5, 98-110 (2016).
Milchberg, et al., "Polarization of recombination radiation from nonequilibrium plasmas," Physical Review A, vol. 26, No. 2, Aug. 1982, pp. 1023-1029.
Mochizuki, F. et al., "Single-event transient imaging with an ultra-high-speed temporally compressive multiaperture CMOS image sensor," Opt. Express 24, 4155-4176 (2016).
Morgner, et al. "Sub-two-cycle pulses from a Kerr-lens mode-locked Ti:sapphire laser" Optics Letters vol. 24, No. 6, (1999) pp. 411-413.
Momose, et al., "Phase-contrast X—ray computed tomography for observing biological soft tissues" Nature Medicine 2, 473-475 (1996).
Nakagawa, et al., "Sequentially timed all-optical mapping photography (STAMP)," Nat. Photon. 8, 695-700 (2014).
Ng, R. et al., "Light field photography with a hand-held plenoptic camera," Comput. Sci. Tech. Rep. 2, 1-11 (2005).
Nguyen, et al., "Gradient light interference microscopy for 3D imaging of unlabeled specimens" Nature Communications 8, 210 (2017) pp. 1-9.
Nomarski, G. & Weill, A. Application à la métallographie des méthodes interférentielles à deux ondes polarisées. Revue de métallurgie 52, 121-134 (1955).
Nordin, G. P., Meier, J. T., Deguzman, P. C. & Jones, M. W., "Micropolarizer array for infrared imaging polarimetry," J. Opt. Soc. Am. A 16, 1168-1174 (1999).
Oh, S. et al. "Label-Free Imaging of Membrane Potential Using Membrane Electromotility" Biophysical Journal 103, (2012) pp. 11-18.
Okabe, K. et al., "Intracellular temperature mapping with a fluorescent polymeric thermometer and fluorescence lifetime imaging microscopy," Nat. Commun. 3, 705 (2012) pp. 1-7.
Pégard, N. C. et al. Three-dimensional scanless holographic optogenetics with temporal focusing (3D-SHOT). Nature Communications 8, 1228 (2017) pp. 1-14.
Penczak Jr, et al., "The mechanism for continuum polarization in laser induced breakdown spectroscopy of Si (111)," Spectrochim. Acta B 74, 3-10 (2012).
Pian, Q., et al., "Compressive hyperspectral time-resolved widefield fluorescence lifetime imaging" Nat. Photon. 11, 411-414 (2017).
Pfeiffer, F. et al. "Hard-X-ray dark-field imaging using a grating interferometer" Nature Materials 7, 134 (2008).
Qian, Z. et al., "Structure, mechanical properties and surface morphology of the snapping shrimp claw," J. Mater. Sci. 53, 10666-10678 (2018).
Qian, B., et al., "Electron pulse broadening due to space charge effects in a photoelectron gun for electron diffraction and streak camera systems," Journal of Applied Physics 91, 462-468 (2002).
Rivenson, Yair, et al. "Multi-dimensional Imaging by Compressive Digital Holography." Chapt. 4, Multi-Dimensional Imaging (2014), pp. 75-99.
Rohrlich, D. et al., "Cherenkov radiation of superluminal particles" Physical Review A 66, 042102 (2002).
Rouan, D., et al., "The four-quadrant phase-mask coronagraph. I. Principle," Publications of the Astronomical Society of the Pacific 112, 1479 (2000).
Sabatke, D. S. et al., "Snapshot imaging spectropolarimeter," Opt. Eng. 41, (2002) pp. 1048-1055.
Santos Jr, D. et al. "Laser-induced breakdown spectroscopy for analysis of plant materials: a review" Spectrochim. Acta B 71, 3-13 (2012).
Sarafraz, et al., "Enhancing images in scattering media utilizing 72 stereovision and polarization," 2009 Workshop on Applications of Computer Vision (WACV) 1-8.
Selanger, et al., "Fluorescence lifetime studies of Rhodamine 6G in methanol," The Journal of Physical Chemistry 81, 1960-1963 (1977).
Serabyn, E., et al., "An image of an exoplanet separated by two diffraction beamwidths from a star" Nature 464, 1018 (2010).
Shen, Y. R. "The principles of nonlinear optics: Chapter 1" Wiley, 2003, Ch. 1 pp. 1-12.
Shin, S., et al., "Super-resolution three-dimensional fluorescence and optical diffraction tomography of live cells using structured illumination generated by a digital micromirror device," Scientific Reports 8, 9183 (2018) pp. 1-8.
Shiraga, H., et al., "Two-dimensional sampling-image x-ray streak camera for ultrafast imaging of inertial confinement fusion plasmas," Rev. Sci. Instrum. 70, 620-623 (1999).
Shrestha, S. et al. "High-speed multispectral fluorescence lifetime imaging implementation for in vivo applications" Optics Letters 35, 2558-2560 (2010).
Siaulys, et al., "Direct holographic imaging of ultrafast laser damage process in thin films" Optics Letters vol. 39, No. 7, Apr. 1, 2014, pp. 2164-2167.
Solli, et al., "Optical rogue waves," Nature 450, Dec. 13, 2007, pp. 1054-1057.
Suzuki, T. et al. "Sequentially timed alloptical mapping photography (ST AMP) utilizing spectral filtering," Opt. Express 23, 30512-30522 (2015).
Tamamitsu, M. et al. "Design for sequentially timed all-optical mapping photography with optimum temporal performance" Optics Letters vol. 40, No. 4, pp. 633-636 (2015).
Takeda, J. et al. "Time-resolved luminescence spectroscopy by the optical Kerr-gate method applicable to ultrafast relaxation processes" Physical Review B 62, pp. 10083-10087 (2000).
Tong, T., Li, J. & Longtin, J.P., Real-time control of ultrafast laser micromachining by laser-induced breakdown spectroscopy,Appl. Opt. 43, 1971-1980 (2004).

(56) References Cited

OTHER PUBLICATIONS

Tyo, J. S., "Hybrid division of aperture/division of a focalplane polarimeter for real-time polarization imagery without an instantaneous field-of-view error," Opt. Lett. 31, 2984-2986 (2006).

Velasco, E., "Ultrafast Camera Takes 1 Trillion Frames Per Second of Transparent Objects and Phenomena," Caltech, Jan. 17, 2020, pp. 1-2. <URL:https://www.caltech.edu/about/news/ultrafast-camera-takes-1-trillion-frames-second-transparent-objects-and-phenomena>.

Veysset, D. et al. Single-bubble and multibubble cavitation in water triggered by laser-driven focusing shock waves. Physical Review E 97, 053112 (2018).

Veysset, et al., "Interferometric analysis of laser-driven cylindrically focusing shock waves in a thin liquid layer" Scientific Reports 6, 24 (2016) pp. 1-7.

Vogel, et al., "Shock wave emission and cavitation bubble generation by picosecond and nanosecond optical breakdown in water" The Journal of the Acoustical Society of America 100, (1996) pp. 148-165.

Wang Jingge et al., "Temporal and Spatial Evolution of Laser-Induced Plasma from a Slag Sample" Plasma Sci. Technol. 17, 649 (2015) pp. 649-655.

Wang, P. & Menon, R., "Computational multispectral video imaging," J. Opt. Soc. Am. A 35, pp. 189-199 (2018).

Wang, P. & Menon, R., "Ultra-high-sensitivity color imaging via a transparent diffractive-filter array and computational optics," Optica 2, pp. 933-939 (2015).

Wetzstein, et al., "On plenoptic multiplexing and reconstruction," Int. J. Comput. Vis. 101, 384-400 (2013).

Wu, J.-L. et al., "Ultrafast laser-scanning time-stretch imaging at visible wavelengths," Light Sci. Appl. 6, e16196 (2017).

Yang, C. et al., "Optimizing codes for compressed ultrafast photography by the genetic algorithm," Optica 5, 147-151 (2018).

Yang, et al., "Compressed ultrafast photography by multi-encoding imaging," Laser Physics Letters 15(11) 116202 (2018).

Wang, P., et al., "Single-shot ultrafast imaging attaining 70 trillion frames per second," Nature Communications 11(1) (2020), pp. 1-9.

Yeola, S., Kuk, D. & Kim, K.-Y., "Single-shot ultrafast imaging via spatiotemporal division of femtosecond laser pulses," J. Opt. Soc. Am. B 35, (2018) pp. 2822-2827.

Yu, Z., et al., "Efficiency and temporal response of crystalline Kerr media in collinear optical Kerr gating" Optics Letters vol. 36, No. 15, Aug. 1, 2011, pp. 2904-2906.

Yue, Q.-Y., et al., "One-shot time-resolved holographic polarization microscopy for imaging laser-induced ultrafast phenomena" Optics Express 25, 14182-14191 (2017).

Zdora, et al., "X-ray Phase-Contrast Imaging and Metrology through Unified Modulated Pattern Analysis" Physical Review Letters 118, 203903 (2017).

Zeng, X. et al. "High-resolution single-shot ultrafast imaging at ten trillion frames per second" arXiv:1807.00685 (2018).

Zernike, F. "How I discovered phase contrast" Science 121, Mar. 11, 1955, pp. 345-349. <URL:http://www.jstor.org/stable/1682470>.

Zewail, A. H. "Four-Dimensional Electron Microscopy" Science 328, 187-193 (2010).

Zhao, Y., et al., "Polarization-resolved laser-induced breakdown spectroscopy," Opt. Lett. 34, 494-496 (2009).

Zhou, R., et al., "Detecting 20 nm Wide Defects in Large Area Nanopatterns Using Optical Interferometric Microscopy" Nano Letters 13, 3716-3721 (2013).

Zhu, B., et al., "Image reconstruction by domain-transform manifold learning" Nature 555, 487 (2018).

Zhu, P., et al., "Complete measurement of spatiotemporally complex multi-spatial-mode ultrashort pulses from multimode optical fibers using delay-scanned wavelength-multiplexed holography" Optics Express 25, (2017) pp. 24015-24032.

Zhu, et al., "Space- and intensity-constrained reconstruction for compressed ultrafast photography," Optica 3(7) 694-697 (2016).

Zipunnikov, V. et al., "Functional principal component model for high-dimensional brain imaging," NeuroImage 58, 772-784 (2011).

U.S. Appl. No. 17/030,056, filed Sep. 23, 2020, Wang et al.

\* cited by examiner

PHASE-SENSITIVE COMPRESSED ULTRAFAST PHOTOGRAPHY SYSTEMS AND METHODS

CROSS-REFERENCES TO RELATED APPLICATIONS

This application claims priority to and benefit of U.S. Provisional Patent Application No. 62/812,411, titled "Picosecond-Resolution Phase-Sensitive Compressed Ultrafast Photography (pCUP) in a Single-Shot" and filed on Mar. 1, 2019, which is hereby incorporated by reference in its entirety and for all purposes.

FEDERALLY SPONSORED RESEARCH OR DEVELOPMENT

This invention was made with government support under Grant Nos. EB016986 and NS090579 awarded by National Institutes of Health. The government has certain rights in the invention.

FIELD

Certain embodiments generally relate to ultrafast imaging and, more specifically, certain aspects pertain to phase-sensitive compressed ultrafast photography techniques.

BACKGROUND

Capturing transient scenes at a high imaging speed has been pursued by photographers for centuries, tracing back to Muybridge's 1878 recording of a horse in motion and Mach's 1887 photography of a supersonic bullet. However, not until the late 20th century were breakthroughs achieved in demonstrating high speed imaging over one hundred thousand (100,000) frames per second. In particular, the introduction of electronic imaging sensors, such as the charge-coupled device (CCD) and complementary metal-oxide-semiconductor (CMOS), revolutionized high-speed photography, enabling acquisition rates up to ten million (10,000,000) frames per second. Despite the widespread impact of these sensors, further increasing frame rates of imaging systems using CCD or CMOS is fundamentally limited by their on-chip storage and electronic readout speed.

SUMMARY

Certain aspects pertain to phase-sensitive compressed ultrafast photography (pCUP) methods and/or systems that can be used, for example, to image ultrafast phenomena in transparent and semi-transparent objects.

Certain aspects pertain to a phase-sensitive compressed ultrafast photography (pCUP) system for obtaining a series of final recorded images of a subject. In one implementation, the pCUP system comprises a dark-field imaging system and a compressed ultrafast photography (CUP) system. The dark-field imaging systems includes a laser source configured to illuminate the subject with at least a first laser pulse for an imaging duration and a beam block configured to pass laser light scattered by the subject upon illumination by the first laser pulse as a first series of phase images and block laser light not scattered by the subject. The CUP system is configured to receive the laser light scattered by the subject and passed by the beam block. The CUP system includes a spatial encoding module configured to receive the first series of phase images and to produce a second series of spatially encoded phase images, each spatially encoded phase image of the second series comprising at least a first view including one phase image of the first series superimposed with a pseudo-random binary spatial pattern. The CUP system also includes a streak camera coupled to the spatial encoding module, the streak camera configured to receive the second series of spatially encoded phase images, to deflect each spatially encoded phase image by a temporal deflection distance that varies as a function of time-of-arrival, and to integrate the deflected phase images into a single raw CUP image.

Certain aspects pertain to a compressed ultrafast photography (CUP) system for imaging a subject. In one implementation, the CUP system includes an imaging system configured to illuminate the subject with at least a first laser pulse and produce a first series of images of the subject and also includes a compressed ultrafast photography (CUP) system configured to receive the first series of images of the subject. The CUP system includes a spatial encoding module configured to receive the first series of images and to produce a second series of spatially encoded images, each spatially encoded image of the second series including a first view including one image of the first series superimposed with a pseudo-random binary spatial pattern and a second view including the one image of the first series superimposed with a complementary pseudo-random binary spatial pattern; at least one optical component configured to transform the first view and/or the second view such that the first view is rotated 180° relative to the second view; and a streak camera coupled to the at least one optical component, the streak camera configured to receive the second series of spatially encoded images with the first view rotated 180° relative to the second view, configured to deflect each spatially encoded image by a temporal deflection distance that varies as a function of time-of-arrival, and to integrate the deflected images into a single raw CUP image.

Certain aspects pertain to a method of obtaining a series of final recorded phase images of an object using a phase-sensitive compressed-sensing ultrafast photography system. In one implementation, the method includes collecting a first series of phase images of a subject; superimposing a pseudo-random binary spatial pattern onto each phase image of the first series to produce a first view of a second series of spatially encoded images; deflecting each spatially encoded image of the second series by a temporal deflection distance that varies as a function of a time-of-arrival of each spatially encoded image; recording each deflected spatially encoded image as a third series of spatially and temporally encoded phase images; and reconstructing a fourth series of final phase images by processing each spatially and temporally encoded phase image of the third series according to an image reconstruction algorithm.

These and other features are described in more detail below with reference to the associated drawings.

Figure 1:
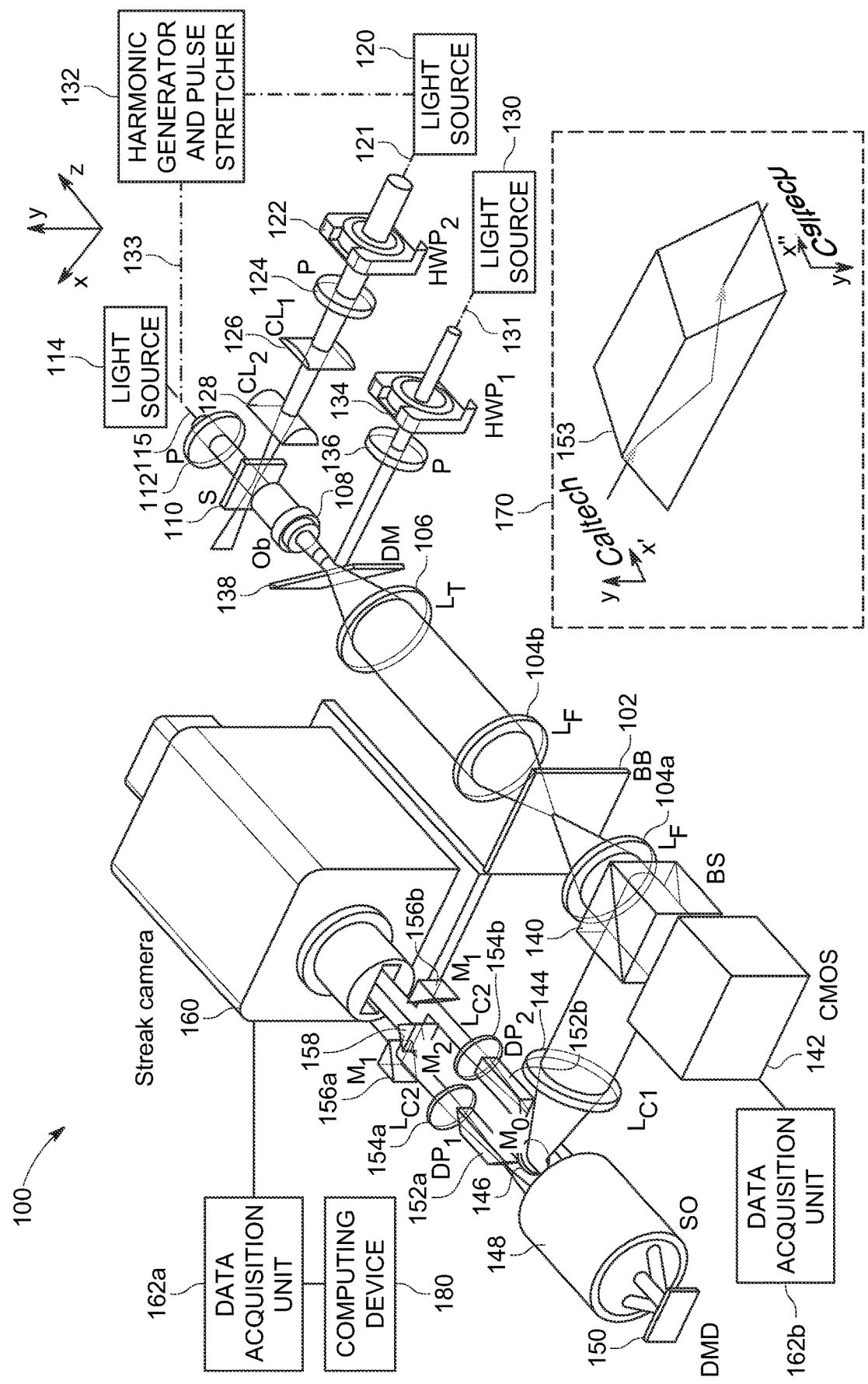
FIG. 1 is a schematic diagram of components of a phase-sensitive compressed ultrafast photography (pCUP) system, according to certain implementations.

These and other features are described in more detail below with reference to the associated drawings.

DETAILED DESCRIPTION

Different aspects are described below with reference to the accompanying drawings. The features illustrated in the drawings may not be to scale. In the following description, numerous specific details are set forth in order to provide a thorough understanding of the presented embodiments. The disclosed embodiments may be practiced without one or more of these specific details. In other instances, well-known operations have not been described in detail to avoid unnecessarily obscuring the disclosed embodiments. While the disclosed embodiments will be described in conjunction with the specific embodiments, it will be understood that it is not intended to limit the disclosed embodiments. Certain aspects pertain to phase-sensitive compressed ultrafast photography (pCUP) methods and/or systems that can be used, for example, to image ultrafast phenomena in transparent and semi-transparent objects.

I. Introduction

Phase-sensitive imaging methods, such as phase contrast, differential interference contrast and dark-field imaging, enable the study of transparent objects by rendering the phase delay caused by the object without using any exogenous contrast agents, such as fluorescence tags. Examples of phase-sensitive imaging methods, which are hereby incorporated by reference in their entireties, are described by Zernike, F., "How I discovered phase contrast," *Science* 121, 345-349 (1955); Nomarski, G. & Weill, A., "Application à la métallographie des méthodes interférentielles à deux ondes polarisées," *Revue de métallurgic* 52, 121-134 (1955); and Gage, S. H., "Modern dark-field microscopy and the history of its development," *Transactions of the American Microscopical Society* 39, 95-141 (1920).

The application of phase imaging covers a vast range of fields, including biological microscopy, optical metrology, and astronomy. Additional examples of phase-sensitive imaging methods, which are hereby incorporated by reference in their entireties, are described by Momose, A., Takeda, T., Itai, Y. & Hirano, K., "Phase-contrast X-ray computed tomography for observing biological soft tissues," *Nature Medicine* 2, 473-475 (1996); Davis, T. J., Gao, D., Gureyev, T. E., Stevenson, A. W. & Wilkins, S. W., "Phase-contrast imaging of weakly absorbing materials using hard X-rays," *Nature* 373, 595-598 (1995); Pfeiffer, F. et al., "Hard-X-ray dark-field imaging using a grating interferometer," *Nature Materials* 7, 134 (2008); Serabyn, E., Mawet, D. & Burruss, R., "An image of an exoplanet separated by two diffraction beamwidths from a star," *Nature* 464, 1018 (2010); Zdora, M.-C. et al., "X-ray Phase-Contrast Imaging and Metrology through Unified Modulated Pattern Analysis," *Physical Review Letters* 118, 203903 (2017); Zhou, R., Edwards, C., Arbabi, A., Popescu, G. & Goddard, L. L., "Detecting 20 nm Wide Defects in Large Area Nanopatterns Using Optical Interferometric Microscopy," *Nano Letters* 13, 3716-3721 (2013); and Rouan, D., Riaud, P., Boccaletti, A., Clénet, Y. & Labeyrie, A., "The four-quadrant phase-mask coronagraph. I. Principle," *Publications of the Astronomical Society of the Pacific* 112, 1479 (2000).

Phase imaging techniques can break the diffraction limit and achieve high-resolution unlabeled imaging of transparent objects in 3D. Examples of phase-sensitive imaging methods breaking the diffraction limit and/or achieving high-resolution unlabeled imaging of transparent objects in 3D, which are hereby incorporated by reference in their entireties, are described by Marquet, P. et al., "Digital holographic microscopy: a noninvasive contrast imaging technique allowing quantitative visualization of living cells with subwavelength axial accuracy," *Optics Letters* 30, 468-470 (2005); Choi, W. et al., "Tomographic phase microscopy," *Nature Methods* 4, 717 (2007); Jiang, H. et al., "Quantitative 3D imaging of whole, unstained cells by using X-ray diffraction microscopy," *Proceedings of the National Academy of Sciences* 107, 11234-11239 (2010); Cotte, Y. et al., "Marker-free phase nanoscopy," *Nature Photonics* 7, 113 (2013); Kim, T. et al., "White-light diffraction tomography of unlabelled live cells," Nature Photonics 8, 256 (2014); Nguyen, T. H., Kandel, M. E., Rubessa, M., Wheeler, M. B. & Popescu, G., "Gradient light interference microscopy for 3D imaging of unlabeled specimens," *Nature Communications* 8, 210 (2017); Horstmeyer, R., Chung, J., Ou, X., Zheng, G. & Yang, C., "Diffraction tomography with Fourier ptychography," *Optica* 3, 827-835 (2016); and Shin, S., Kim, D., Kim, K. & Park, Y., "Super-resolution three-dimensional fluorescence and optical diffraction tomography of live cells using structured illumination generated by a digital micromirror device," *Scientific Reports* 8, 9183 (2018).

Phase imaging has become essential for new scientific discoveries, especially in biological sciences, by allowing for label-free optical detection of nanoscale sub-cellular activities. Examples of phase-sensitive imaging methods in biological, which are hereby incorporated by reference in their entireties, are described by Chen, M., Tian, L. & Waller, L., "3D differential phase contrast microscopy," *Biomedical Optics Express* 7, 3940-3950 (2016); Pégard, N. C. et al., "Three-dimensional scanless holographic optogenetics with temporal focusing (3D-SHOT)," *Nature Communications* 8, 1228 (2017); Kandel, M. E. et al., "Three-dimensional intracellular transport in neuron bodies and neurites investigated by label-free dispersion-relation phase spectroscopy," *Cytometry Part A* 91, 519-526 (2017); Kim, G. et al., "Measurements of three-dimensional refractive index tomography and membrane deformability of live erythrocytes from Pelophylax nigromaculatus," *Scientific Reports* 8, 9192 (2018); Jung, J. et al., "Label-free non-invasive quantitative measurement of lipid contents in individual microalgal cells using refractive index tomography," *Scientific Reports* 8, 6524 (2018); and Kim, K. & Park, Y., "Tomographic active optical trapping of arbitrarily shaped objects by exploiting 3D refractive index maps," *Nature Communications* 8, 15340 (2017).

Attempts have been made to improve the speed of phase imaging for the potential application in studying a variety of ultrafast events, such as ultrashort laser pulse's propagation, laser-induced damages, and shockwaves. Examples of ultrafast phase-sensitive imaging methods, which are hereby incorporated by reference in their entireties, are described by Li, Z. et al., "Single-Shot Visualization of Evolving Laser Wakefields Using an All-Optical Streak Camera," *Physical Review Letters* 113, 085001 (2014); Medhi, B., Hegde, G. M., Reddy, K. J., Roy, D. & Vasu, R. M., "Shock-wave imaging by density recovery from intensity measurements," *Applied Optics* 57, 4297-4308 (2018); Šiaulys, N., Gallais, L. & Melninkaitis, A., "Direct holographic imaging of ultrafast laser damage process in thin films," *Optics Letters* 39, 2164-2167 (2014); Gabolde, P. & Trebino, R., "Single-shot measurement of the full spatio-temporal field of ultra-short pulses with multi-spectral digital holography," *Optics Express* 14, 11460-11467 (2006); Gabolde, P. & Trebino, R., "Single-frame measurement of the complete spatiotemporal intensity and phase of ultrashort laser pulses using wavelength-multiplexed digital holography," *The Journal of the Optical Society of America B* 25, A25-A33 (2008); Le Blanc, S. P., Gaul, E. W., Matlis, N. H., Rundquist, A. & Downer, M. C., "Single-shot measurement of temporal phase shifts by frequency-domain holography," *Optics Letters* 25, 764-766 (2000); Bradley, D. K. et al., "High-speed gated x-ray imaging for ICF target experiments (invited)," *Review of Scientific Instruments* 63, 4813-4817 (1992); and Kodama, R. et al., "Fast heating of ultrahigh-density plasma as a step towards laser fusion ignition," *Nature* 412, 798 (2001).

With the growing interest in optical detection of neuronal action potential, the field of phase imaging has started to seek a drastic improvement in speed to match the propagation speed of neuronal action potentials. Examples of ultrafast imaging of neuronal action potentials, which are hereby incorporated by reference in their entireties, are described by Marquet, P., Depeursinge, C. & Magistretti, P. J., *Review of quantitative phase-digital holographic microscopy: promising novel imaging technique to resolve neuronal network activity and identify cellular biomarkers of psychiatric disorders*. Vol. 1 (SPIE, 2014); Batabyal, S. et al., "Label-free optical detection of action potential in mammalian neurons," *Biomedical Optics Express* 8, 3700-3713 (2017); and Oh, S. et al., "Label-Free Imaging of Membrane Potential Using Membrane Electromotility," *Biophysical Journal* 103, 11-18 (2012).

Several techniques have succeeded in detecting ultrafast phase signals. Detections of phase signals using digital light-in-flight recording by holography (LIF-DH), time-resolved holographic polarization microscopy (THPM), and ultrafast framing camera (UFC) have been realized. Examples of techniques for detecting ultrafast phase, which are hereby incorporated by reference in their entireties, are described by Kakue, T. et al , "Digital Light-in-Flight Recording by Holography by Use of a Femtosecond Pulsed Laser," *IEEE Journal of Selected Topics in Quantum Electronics* 18, 479-485 (2012); Komatsu, A., Awatsuji, Y. & Kubota, T., "Dependence of reconstructed image characteristics on the observation condition in light-in-flight recording by holography," *The Journal of the Optical Society of America A* 22, 1678-1682 (2005); Yue, Q.-Y., Cheng, Z.-J., Han, L., Yang, Y. & Guo, C.-S., "One-shot time-resolved holographic polarization microscopy for imaging laser-induced ultrafast phenomena," *Optics Express* 25, 14182-14191 (2017); Veysset, D., Maznev, A. A., Pezeril, T., Kooi, S. & Nelson, K. A., "Interferometric analysis of laser-driven cylindrically focusing shock waves in a thin liquid layer," *Scientific Reports* 6, 24 (2016); and Veysset, D. et al., "Single-bubble and multibubble cavitation in water triggered by laser-driven focusing shock waves," *Physical Review E* 97, 053112 (2018). Although these techniques achieve high frame rate imaging, their sequence depths (i.e., the number of frames per movie) are limited by several factors, such as the number of imaging pulses (THPM), the trade-off between the sequence depth and the field of view (LIF-DH), and the number of detector arrays (UFC). The typical sequence depths reported for these techniques are 16 frames per movie at the maximum.

In certain aspects, the phase-sensitive compressed ultrafast photography (pCUP) methods and systems disclosed herein can overcome the limitations of prior phase signal detection schemes. The pCUP methods and system combine compressed ultrafast photography (CUP) methods and systems with phase-sensitive dark-field imaging methods and systems. An example of a compressed ultrafast photography (CUP) system is described by Gao, L., Liang, J., Li, C. & Wang, L. V., "Single-shot compressed ultrafast photography at one hundred billion frames per second," *Nature* 516, 74 (2014), which is hereby incorporated by reference in its entirety.

CUP is based on compressed sensing theory and streak camera technology to achieve receive-only single-shot ultrafast imaging of up to 350 frames per event at 100 billion frames per second (Gfps). Since CUP operates as a passive detector, it can be coupled to many optical imaging systems. Examples of coupling CUP systems to various optical imaging systems, which are hereby incorporated by reference in their entireties, are described by Liang, J., Gao, L., Hai, P., Li, C. & Wang, L. V., "Encrypted Three-dimensional Dynamic Imaging using Snapshot Time-of-flight Compressed Ultrafast Photography," *Scientific Reports* 5, 15504 (2015); Zhu, L. et al., "Space- and intensity-constrained reconstruction for compressed ultrafast photography," *Optica* 3, 694-697 (2016); Liang, J. et al., "Single-shot real-time video recording of a photonic Mach cone induced by a scattered light pulse," *Science Advances* 3, e1601814 (2017); and Liang, J., Zhu, L. & Wang, L. V., "Single-shot real-time femtosecond imaging of temporal focusing," *Light: Science & Applications* 7, 42 (2018).

By combining CUP with dark-field microscopy, pCUP can image ultrafast phase signals with a noise-equivalent sensitivity of 2.5 mrad. The ultrafast real-time phase imaging capability of pCUP is demonstrated by imaging three different events: (1) phase signals from transparent 50-nm-diameter $SiO_2$ beads in immersion oil (see, e.g., the discussion of FIGS. 2A and 2B), (2) traveling phase signals induced by the optical Kerr effect in a crystal (see, e.g., the discussion of FIGS. 3A and 3B), and (3) propagating phase signals caused by laser-induced shockwaves in water (see, e.g., the discussion of FIGS. 4A and 4B).

II. Phase-Sensitive Compressed Ultrafast Photography (pCUP)

FIG. 1 is a schematic diagram of components of a phase-sensitive compressed ultrafast photography (pCUP) system 100, according to certain implementations. In some aspects, pCUP includes two components, a dark-field microscope system and a compressed ultrafast photography (CUP) detection system. In some embodiments, the CUP system may be a lossless-encoding compressed ultrafast photography (LLE-CUP) system.

A. Dark-Field Imaging Subsystem

In some aspects, pCUP system 100 includes a dark-field imaging subsystem. The dark-field imaging subsystem may include, as examples, beam-block 102, Fourier lenses 104a and 104b, tube lens 106, objective lens 108, sample 110, linear polarizer 112 and light source 114 that produces imaging pulse(s) 115. Such a configuration was utilized in imaging phase signals from transparent 50-nm-diameter $SiO_2$ beads in immersion oil (see, e.g., the discussion of FIGS. 2A and 2B). The objective lens 108, in one configuration, has a magnification of 20×, has plan N (normal field of view plan) optical corrections, and has a numerical aperture of 0.4.aaaaaaaaaaaaa Dark-field imaging is, in some embodiments, achieved by blocking the unscattered light (e.g., light not scattered by a subject or phenomena of interest) at a Fourier plane using the beam block 102. Beam block 102 can be formed from an anodized aluminum disc attached to a glass cover slip. The size of the beam block depends on the magnification of the system including the magnification of objective lens 108. The magnification of the system, the size of the beam block, and other appropriate properties of the pCUP system may be varied to select for and/or optimize various characteristics of the system as imaging conditions, subjects to be imaged, and other factors change. As examples, various properties of a pCUP system such as the size of the beam block may be selected to provide the maximum signal-to-background ratio (SBR) and/or to provide the maximum signal-to-noise ratio (SNR).

The dark-field imaging subsystem may be reconfigured as desired for different imaging tasks. As an example, the dark-field imaging subsystem can be modified by including light source 120 that produces pump pulse 121, half-wave plate 122, linear polarizer 124, cylindrical lens 126, and cylindrical lens 128. Additionally, light source 114 may be omitted (or not utilized) and harmonic generator and pulse stretcher 132 may be included. Such a configuration was utilized in imaging traveling phase signals induced by the optical Kerr effect in a crystal (see, e.g., the discussion of FIGS. 3A and 3B).

Harmonic generator and pulse stretcher 132 may receive a portion of the pump pulse 121 from light source 120, convert the pulse to a different shorter wavelength (using a harmonic generator), and temporally stretch the pulse into imaging pulse 133. The output of harmonic generator and pulse stretcher 132 may be utilized within the dark-field imaging subsystem as imaging pulse 133. The use of harmonic generator and pulse stretcher 132 may enable the use of a single light source to generate the imaging pulse and the pump pulse. Thus, harmonic generator and pulse stretcher 132 facilitates improved synchronization between the imaging pulse and the pump pulse.

Half-wave plate 122 may facilitate adjusting the polarization direction of pump pulse 121. It may be desirable to adjust the polarization direction of pump pulse 121 to image an object or phenomena multiple times, with the pump pulse polarization direction varied between one or more of the imaging operations. Additionally, it may be desirable to adjust the polarization direction of pump pulse 121 based on changes to optical components in system 100.

While imaging traveling phase signals induced by the optical Kerr effect in a crystal, a cylindrical lens 126 was provided that had a 1000-nm focal length and a cylindrical lens 128 was provided that had a 500-nm focal length. The focal lengths of cylindrical lenses 126 and 128 can, in general, be varied based on numerous factors and the focal lengths described herein are merely examples of potential focal lengths.

As another example of reconfiguring the dark-field imaging system for an imaging task, the dark-field imaging subsystem can be modified by including light source 130 that produces shockwave pulse 131, half-wave plate 134, linear polarizer 136, and dichroic mirror 138. Light source 130 may, in some configurations, produce a shockwave pulse 131 having a 1,062 nanometer (nm) wavelength and a 10 picosecond (PS) duration. Such a configuration was utilized in imaging propagating phase signals caused by laser-induced shockwaves in water (see, e.g., the discussion of FIGS. 4A and 4B).

Half-wave plate 134 may facilitate adjusting the polarization direction of pump pulse 121. It may be desirable to adjust the polarization direction of pump pulse 121 to image an object or phenomena multiple times, with the pump pulse polarization direction varied between one or more of the imaging operations. Additionally, it may be desirable to adjust the polarization direction of pump pulse 121 based on changes to optical components in system 100.

Dichroic mirror 138 may be a shortpass dichroic mirror with a frequency cut-off of approximately 805 nanometers (nm). As a shortpass dichroic mirror, mirror 138 may reflect light having wavelengths longer than the frequency cutoff and transmit light having wavelengths shorter than the frequency cutoff. In some examples, imaging pulse 115 may have a wavelength of approximately 532 nm with a 10 nanosecond (ns) duration. Thus, dichroic mirror 138 may substantially reflect shockwave pulse 131 (which may have a wavelength of approximately 1,062 nm) while substantially transmitting imaging pulse 115 as well as light scattered by imaging subjects in sample 110.

B. Compressed Ultrafast Photography (CUP) Subsystem

In some aspects, pCUP system 100 includes a compressed ultrafast photography (CUP) subsystem. The CUP imaging subsystem may receive an image formed by the dark-field imaging subsystem (e.g., light output from a component of the dark-field imaging subsystem such as beam block 102 or Fourier lens 104a). The CUP imaging subsystem may include, as examples, beam splitter 140, CMOS camera 142, lens 144, mirror 146, stereoscope objective 148, digital micromirror device (DMD) 150, dove prisms 152a and 152b, lenses 154a and 154b, mirrors 156a and 156b, prism mirror 158, streak camera 160, data acquisition unit(s) 162a and 162b, and computing device 180. Computing device 180 may be coupled to data acquisition unit 162a (as illustrated) and also to unit 162b (not illustrated for the sake of clarity). Computing device 180 may be configured with a CUP reconstruction algorithm, may receive raw CUP images from streak camera 160 and images from CMOS 142, and may use the images in reconstructing individual image frames. Lenses 156a and 156b may be right-angle prism mirrors. Lens 158 may be a knife-edge right-angle prism mirror. Computing device 180 may be a computer, server, or other device capable of processing raw CUP images from streak camera 160 and images from CMOS 142 into CUP reconstruction algorithm to produce reconstructed image frames.

The image formed by the dark-field subsystem may be received at the entrance plane of CUP imaging subsystem. In particular, the image passing through lens 104a may be received by beam splitter 140 (or, if beam splitter 140 is omitted, whichever other element forms the entrance plane). The beam splitter 140 may send any desired fraction of the incoming light on optical path(s) that lead to CMOS camera 142 and send the remaining light on optical path(s) that lead to streak camera 160. In some configurations, the beam splitter 140 transmits approximately 10% of the light to CMOS camera 142 and reflects approximately 90% of the light onto optical path(s) leading to streak camera 160.

The CMOS camera 142 may be used to obtain an image of the subject that is fully integrated over the exposure time. The fully-integrated image can be used as an input, along with the raw image from streak camera 160, in reconstructing individual image frames. CMOS camera 142 may be referred to as a spatiotemporal integrating module. As an example, CMOS camera 142 can be configured to receive images of the subject (during an imaging operation) and output an image that is fully integrated over the imaging duration (temporal integration). The fully integrated image produced by camera 142 can be utilized to facilitate image reconstruction operations (e.g., by reducing ambiguity in the reconstruction process). Data acquisition unit 162b may acquire the fully-integrated image from CMOS camera 142. In the example imaging configurations described herein, CMOS camera 142 was implemented using a Grasshopper®3 camera from FLIR. Other cameras, including non-CMOS cameras, may be utilized in place of camera 142, as desired.

The portion of light sent by beam splitter 140 on optical path(s) leading to streak camera 160 may be related (by lens 144 and mirror 146, which may be a 0.5" mirror) to stereoscopic objective 148. The stereoscopic objective 148 may, in some configurations, be an MV PLAPO 2XC from Olympus.

The stereoscopic objective 148 then relays the light to a digital micromirror device (DMD) 150. In some configurations, the DMD 150 is a DLP® LightCrafter® from Texas Instruments. DMD 150 may be loaded with a pseudo-random pattern. DMD 150 may, in some embodiments, be referred to as a spatial encoding module. As an example, DMD 150 can be configured to receive images of the subject and output spatially encoding images, where the spatially encoded images include a first view of the images of the subject superimposed with a pseudo-random binary spatial pattern and include a second view of the images of the subject superimposed with a complementary pseudo-random binary pattern. Additionally, the first and second views may be positions in spatially separate regions of the field of view (e.g., in spatially separate regions of the field of view of streak camera 160).

Individual micromirrors within DMD 150 may be binned together (trading resolution for increased signal). In some configurations, DMD 150 may be configured with 3×3 binning (e.g., DMD 150 is divided into groups of 3×3 micromirrors, where the micromirrors in each group are set to a common state). The DMD 150 may have a ⅓× magnification and may split the incoming light into two complementary views, generated by the pseudo-random pattern loaded onto the DMD. As an example, the micromirrors in DMD 150 may be configurable in a first state in which incoming light is reflected towards a first optical path (leading towards dove prism 152a, as an example) or a second state in which incoming light is reflected towards a second optical path (leading towards dove prism 152b, as an example). When loaded with a pseudo-random pattern, approximately half of the binned pixel groups reflect light towards the first optical path, while the remaining binned pixel groups reflect light towards the second optical path.

The two complementary views reflected off of DMD 150 are collected by the spectroscope objective 148 and then are passed through respective dove prisms 152a and 152b, where the dove prisms have a 90° rotation from each other. The dove prisms flip one of the views in the x-direction and the other in the y-direction, and thus, the two views are 180° rotated from each other. A simulation 170 of light passing through a dove prism 153 that flips the y-axis is shown in FIG. 1. After passing through dove prisms 152a and 152b, the complementary (and now 180° rotated) views pass through additional optical components and merge before being received by streak camera 160. As merely an example, FIG. 1 illustrates the complementary views passing separately through lenses 152a and 152b, reflectively separately off of mirrors 156a and 156B, and then reflecting off of prism mirror 158 before passing into streak camera 160.

In the streak camera, the two views experience shearing in opposite directions relative to the image coordinates (due to being rotated via the dove prisms 152a and 152b) to provide a lossless encoding. The two views are then relayed with a 3× magnification and are projected to two separate areas on the photocathode of the streak camera. The stream camera is, in some embodiments, a high dynamic range streak camera such as the C7700 camera from Hamamatsu.

During imaging, the streak camera may have a partially or fully opened slit to capture 2D images. The streak camera 160 converts the arriving photons to electrons at the photocathode, applies time-dependent shearing to these electrons using a sweeping voltage, converts the electrons back to photons using a phosphor screen, amplifies the photos via an image intensifier, and then integrates the time-sheared image on an image sensor. Streak camera 160 may also be referred to as a temporal encoding modulate. As an example, streak camera 160 may receive the entire field of view of the spatially encoded images from DMD 150, deflect each spatially encoded image by a temporal deflection distance proportional to time-of-arrival, and record each deflected image as a series of spatially & temporally encoded images.

The frame rate of the pCUP system 100 can be adjusted by adjusting the timeframe of the time-dependent shearing within the streak camera 160. As an example, the pCUP system 100 can be configured to capture a 100 frame sequence at 10 Gfps by completing the full sweep of the time-dependent shearing in 10 nanoseconds. As another example, the pCUP system 100 can be configured to capture a 100 frame sequence at 1 Tfps by completing the full sweep of the time-dependent shearing in 100 picoseconds. The pCUP system 100 can be configured with any desired frame rate include, but not limited to, at least 10 Gfps, at least 100 Gfps, at least 500 Gfps, at least 750 Gfps, and at least 1 Tfps.

The image sensor in the streak camera 160 may be a CMOS camera such as the ORCA-Flash4.0 V2 from Hamamatsu. The integrated time-sheared image produced by the image sensor forms a single-shot pCUP raw image. Data acquisition unit 162a may acquire the pCUP raw image from the streak camera 160. If desired, data acquisition units 162a and 162b may be integrated into a single data acquisition unit.

The intensity distribution of a dark-field image is a function of the incident light intensity $I_0(x, y; t)$ and the phase delay $\phi(x, y; t)$ due to the transparent object: $I_0(x, y; t)(1-\cos\phi(x, y; t))$, where x and y denote the transverse Cartesian coordinates (shown in FIG. 1) and t denotes time. The dark-field image suppresses the background and the associated fluctuation, which are ideal for CUP due to the spatial sparsity (e.g., CUP reconstruction is more difficult when the incoming image light contains a bright background).

III. Imaging a Static Phase Object

Figure 2A:
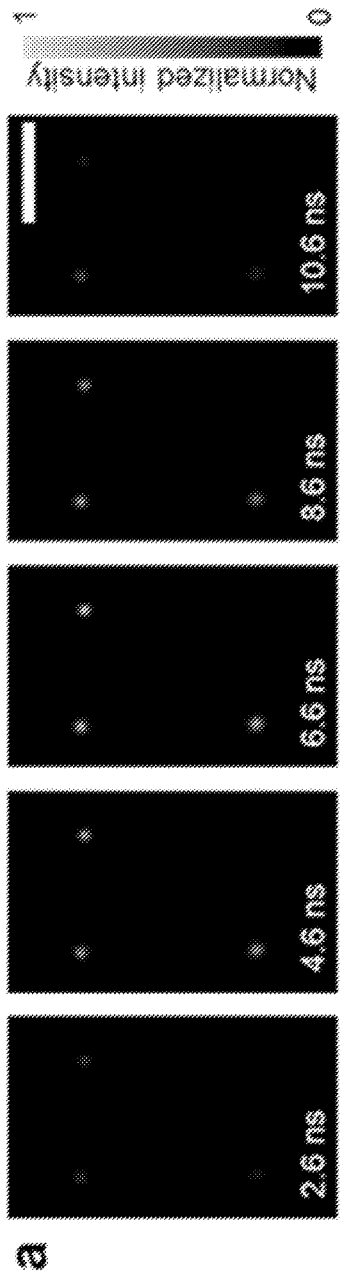
FIG. 2A are pCUP images of 50 nm silicon dioxide beads, according to an aspect.
Figure 2B:
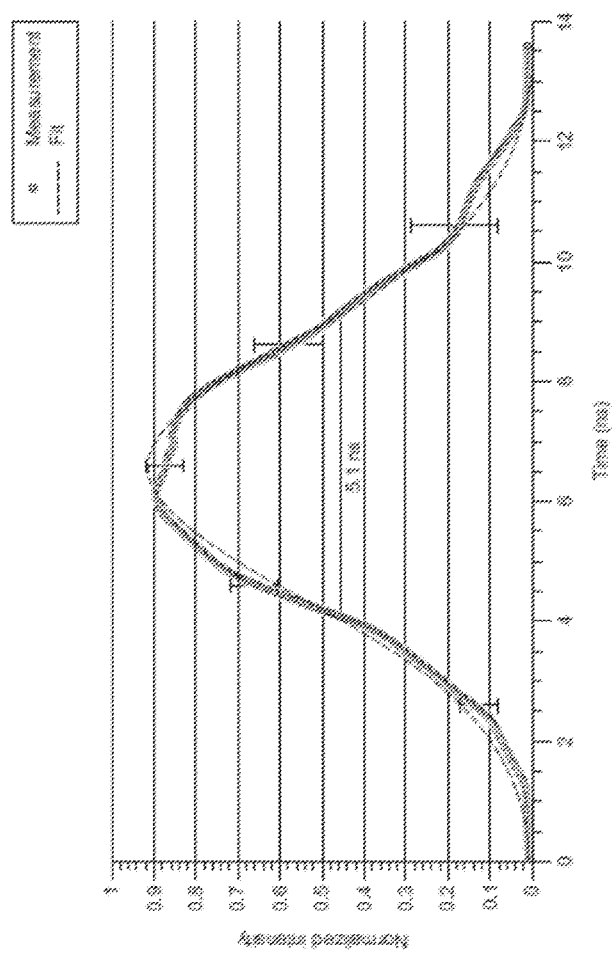
FIG. 2B is a graph of normalized intensity over the imaging duration of the silicon dioxide beads, according to an aspect.

FIG. 2A shows pCUP images of 50 nm silicon dioxide beads and FIG. 2B is a graph of normalized intensity over the imaging duration of the silicon dioxide beads. The 50 nm silicon dioxide beads were imaged using the pCUP system 100 of FIG. 1. The silicon dioxide beads (e.g., SISN50-25N, from Olympus) had a diameter of 50 nanometers (nm) and were immersed in oil (e.g., IMMOIL-F30CC, from Olympus).

According to the refractive index of $SiO_2$ (1.46) and that of the oil (1.518), the maximum phase delay induced by each bead was only 34 mrad, corresponding to a 3 nm optical path length difference at the 532 nm wavelength of light source 114 (e.g., laser source 114). While imaging the silicon dioxide beads, the pCUP system 100 was configured to operate at a frame rate of 20 billion frames-per-second (20 Gfps) and with a 20× objective lens 108 (e.g., the Plan N 20×/0.4 NA, from Olympus) in the dark-field microscope subsystem. Additionally, the light source 114 was configured to provide an imaging pulse 115 having a width of 5 nanoseconds.

FIG. 2A shows five representative frames from the reconstructed image sequence of 270 frames. Since there is no time-dependent phase change on the beads, the intensity change of the images depends only on the temporal change of the intensity of the imaging pulse. The average temporal intensity distribution measured from the beads is displayed in FIG. 2B. When fitted with a Gaussian curve, the average temporal intensity distribution shows a 5.1 ns full width at half maximum (FWHM), agreeing with the imaging pulse width of 5 ns. This result shows that pCUP had captured ultrafast signal changes from phase objects with a 34 mrad phase delay at an SNR of 13.4. Therefore, the noise-equivalent-phase sensitivity is 2.5 mrad. Moreover, coupled with a 20× imaging system, the point spread function had a 2.6 μm FWHM, which defines the spatial resolution of the imaging system. Compared to the diffraction limit of the imaging system, the spatial resolution is reduced because of the encoding and reconstruction process, where the binning of the DMD determines the spatial sampling and the spatial resolution.

IV. One Trillion-Frames-Per-Second (Tfps) Imaging of the Optical Kerr Effect

Figure 3B:
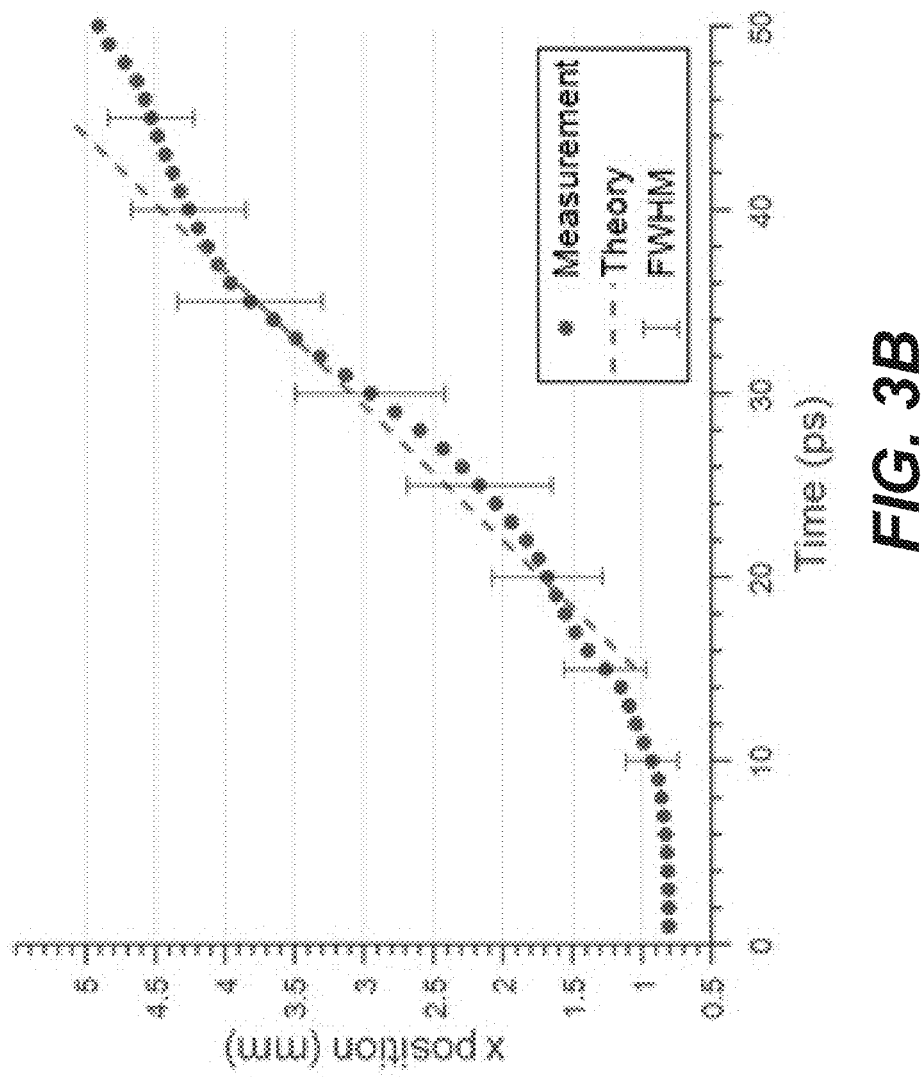
FIG. 3B is a graph of positions of the centroid of the phase signal over the imaging duration of BGO crystal, according to an aspect.
Figure 3A:
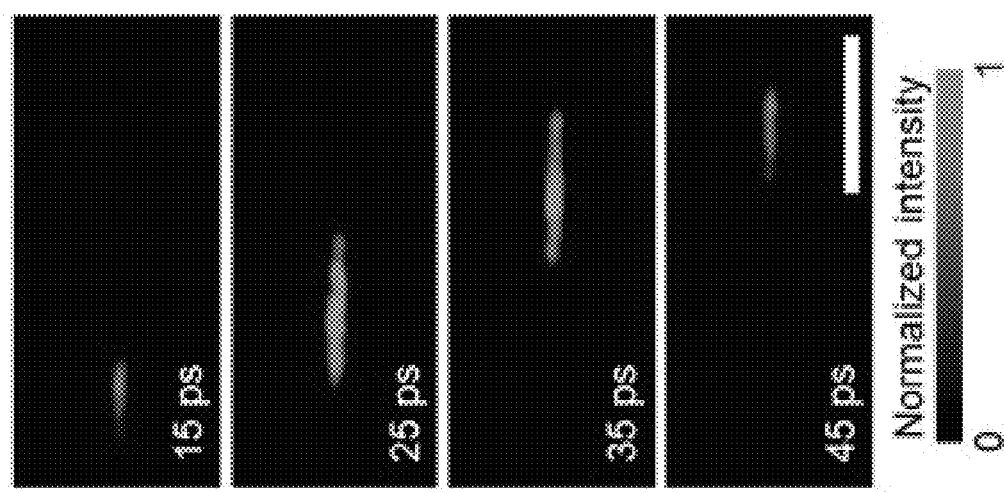
FIG. 3A are pCUP images of the optical Kerr effect inside a $Bi_4Ge_3O_{12}$ (BGO) crystal, according to an aspect.

FIG. 3A shows pCUP images of the optical Kerr effect inside a $Bi_4Ge_3O_{12}$ (BGO) crystal and FIG. 3B is a graph of positions of the centroid of the phase signal over the imaging duration of BGO crystal. The optical Kerr effect inside the BGO crystal was imaged using the pCUP system 100 of FIG. 1, including the additional components of light source 120, half-wave plate 122, polarizer 124, cylindrical lenses 126 and 128, and harmonic generator and pulse stretcher 132. Light source 114 was not utilized.

While imaging the optical Kerr effect inside the BGO crystal, the imaging speed of the pCUP system 100 was increased to one trillion frames-per-second (1 Tfps). The pCUP system 100 may have a maximum framerate in excess of 1 Tfps (e.g., a framerate of at least 1 Tfps). The BGO crystal was a slab with the size of 10×10×0.5 $mm^3$. The Kerr effect was induced by focusing an 800 nm, 50 fs laser pulse (e.g., the pump pulse 121 produced by light source 120) onto the thin side of the crystal slab, while the imaging was performed through the large face of the slab, as shown in FIG. 1. Using a combination of 1000 mm and 500 mm focal length cylindrical lenses (e.g., lenses 126 and 128), the pump pulse 121 was focused into the crystal and the pump pulse 121 traveled through the BGO crystal perpendicularly to the imaging beam (e.g., the imaging pulse 115, produced in this instance by harmonic generator and pulse stretcher 132 rather than light source 114). In order to increase the field of view to capture the traveling pulse over a 6 mm distance, the magnification of the dark-field imaging subsystem was reduced to 1× (e.g., by utilizing a 1× objective lens 108).

For a better synchronization between the pump pulse 121 and the imaging pulse 115, the imaging pulse 115 was also derived from the same laser source 120 as the pump pulse 121. In particular, a first portion of the laser pulse from light source 120 is utilized as pump pulse 121, while a second portion of the laser pulse is redirected to harmonic generator and pulse stretcher 132. Harmonic generator and pulse stretcher 132 converts the 800 nm, 50 femtosecond (fs) laser pulse into a 400 nm, 50 picosecond (ps) laser pulse. In particular, the harmonic generator and pulse stretcher 132 includes a harmonic generator that reduces the wavelength to 400 nm and includes a pulse stretcher that stretcher the pulse temporally to have a duration of 50 ps. The longer duration is helpful to provide a sufficiently long duration.

FIG. 3A shows four representative frames from the reconstructed video. The dark-field images captured in FIG. 3A show that, as the pump pulse travels through the crystal, it induces refractive index changes in the crystal and causes the light to experience phase delay along the pump light path. Since the change of refractive index occurred along the direction of the pump pulse 121 polarization, the polarizations of the pump beam and the imaging beam were aligned along the y-axis (e.g., using one or more half-wave plates such as half-wave plate 122).

In order to compare with theoretical predictions, the centroid along the x-axis for each frame was calculated and plotted in FIG. 3B, along with a line indicating the speed of light in the crystal. Notice that the curve does not appear linear even though the speed of light does not change inside the crystal. This occurs because only a portion of the full phase change is captured towards the beginning and the end of the time series, due to the limited field of view. Because the field of view limits the full 1 mm length of the signal from being imaged towards the beginning and the end of the video, the centroid is overestimated in the earlier frames and underestimated in the later frames. However, the travel speed of the pulse is well matched to the theoretical prediction where the full signal length was displayed in the video, proving that the pCUP system successfully captured the phase signals from the Kerr effect caused by a 50 fs pulse traveling through a BGO crystal.

V. Time-Resolved Imaging of a Shockwave

Figure 4A:
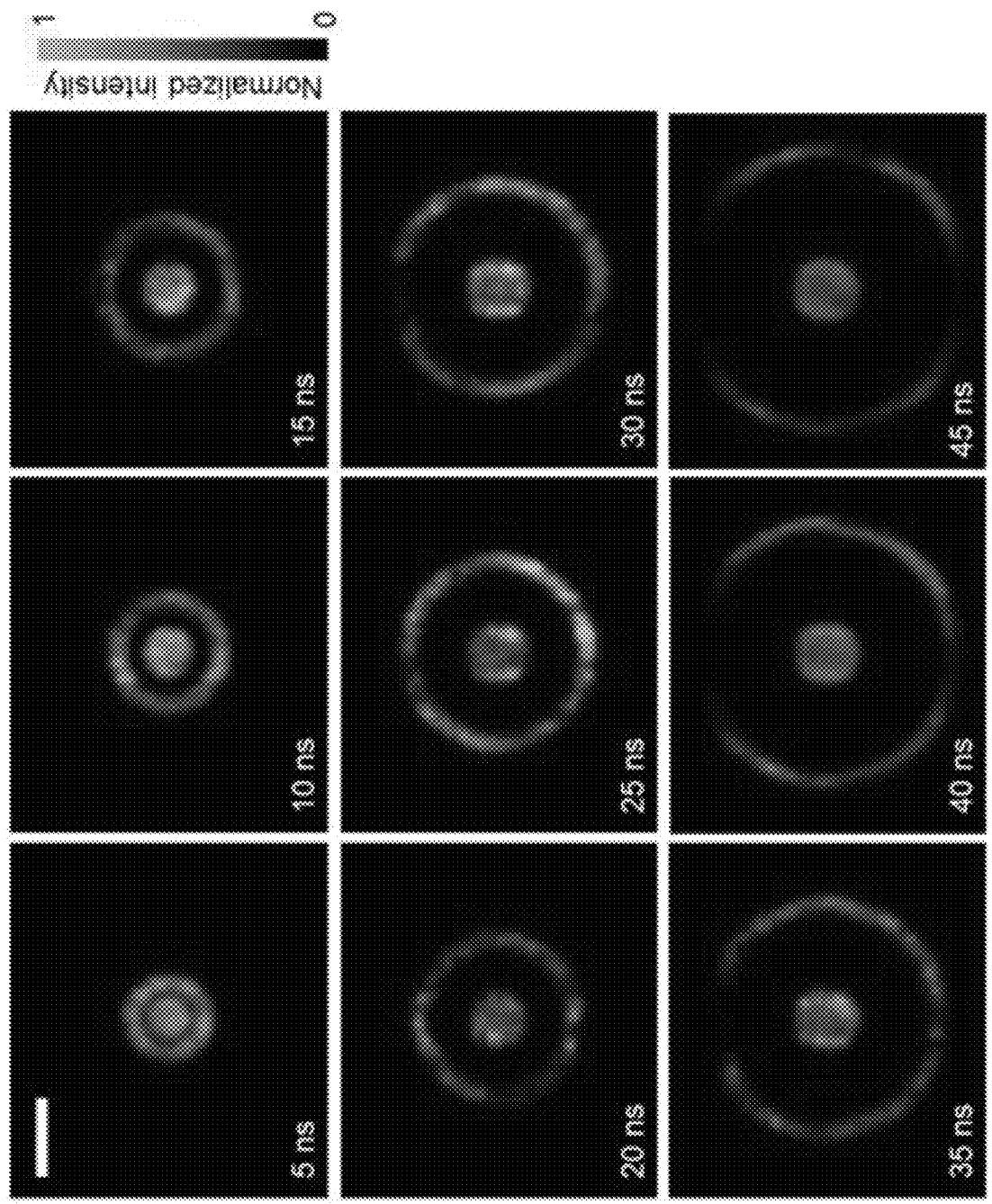
FIG. 4A are pCUP images of laser-induced shockwave propagation in water, according to an aspect.
Figure 4B:
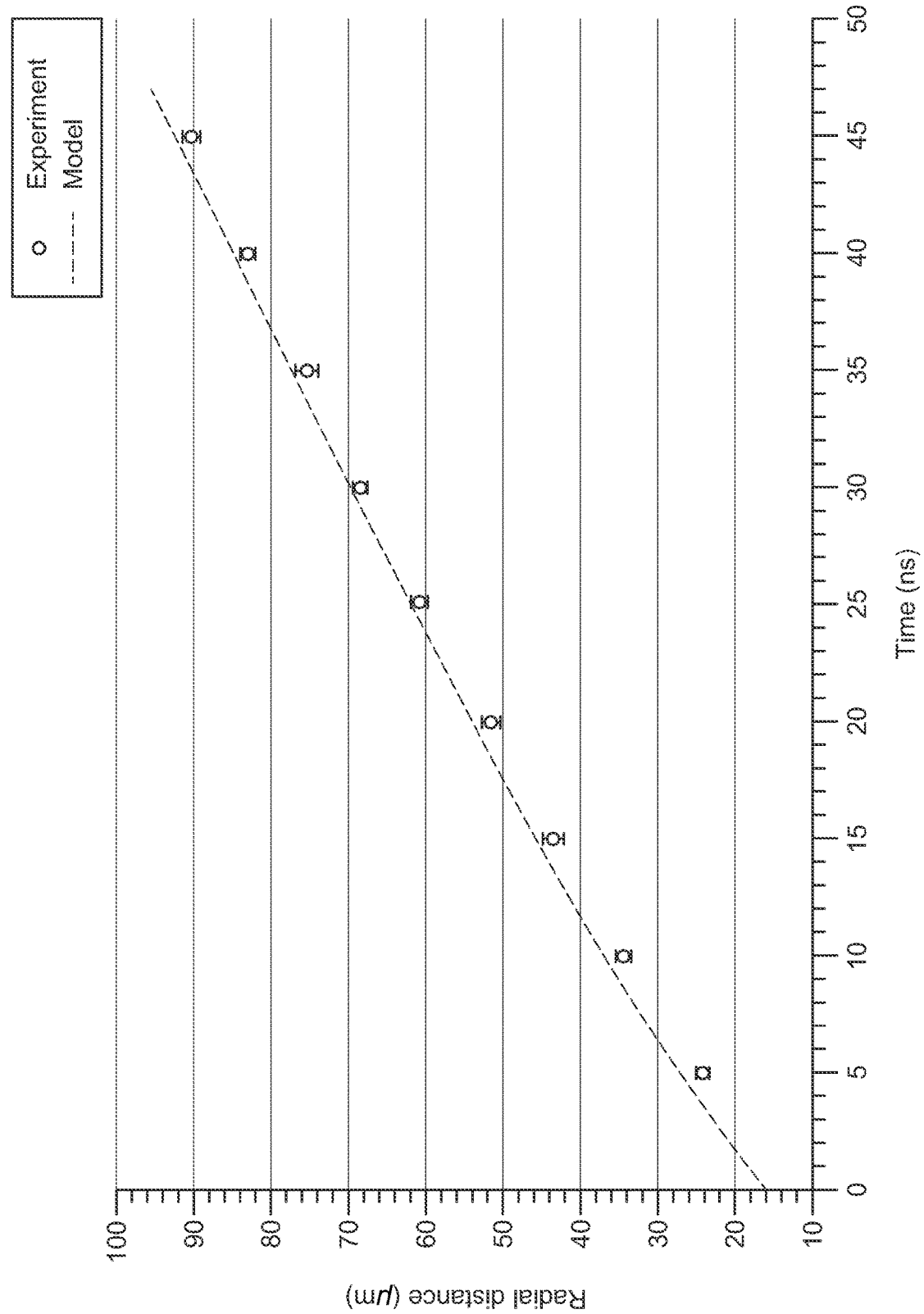
FIG. 4B is a graph of the radius of the shockwave front over the imaging duration, according to an aspect.

FIG. 4A shows pCUP images of laser-induced shockwave propagation in water on the sample plane and FIG. 4B is a graph of the radius of the shockwave front over the imaging duration. The laser-induced shockwave was imaged using the pCUP system of FIG. 1, including the additional components of light source 130, half-wave plate 134, polarizer 136, and dichroic mirror 138.

Light source 130 (e.g., laser 130) was configured to provide a 10 ps, 1064 nm laser pulse as shockwave pulse 131. Shockwave pulse 131 was passed through half-wave plate 134 and polarizer 136, before being reflected by dichroic mirror 138 towards objective lens 108 and focused onto the sample 110. Upon striking the water in sample 110, the shockwave pulse 131 generated a spherically propagating shockwave.

Light source 114 was, in this imaging operation, configured to provide a 532 nm, 10 ns imaging pulse 115. Additionally, the pCUP system was configured with a frame rate of 10 billion frames-per-second (10 Gfps), to match the relatively low propagation speed of the shockwave. Each single shot raw image was reconstructed into a 100-frame time sequence captured at 10 Gfps. Using this setup, four 100-frame sequences were captured, the four sequences respectively starting at 0 ns, 10 ns, 25 ns and 35 ns from the shockwave generation in order to capture the evolution of the shockwave and the cavitation bubble over a total of 45 ns period.

FIG. 4A shows nine representative frames selected from the four pCUP-reconstructed sequences. Each of the representative frames is separated by 5 ns in time to show a complete picture of the propagation.

In FIG. 4B, the radial extend of the shockwave propagation is plotted as a function of time. Each point was plotted by averaging over 16 radial profiles from the center of the shockwave. The green dashed line represents a modeled shockwave propagation. FIG. 4B shows that the measured distance of the shockwave front from the center agrees with the expectation. Interestingly, the decrease in the shockwave propagation speed can also be observed from the decreasing slope of the curve as the time increases. The propagation speed measured from the slope converges to 1470 m/s.

VI. Further Discussion of the pCUP System

By combining the CUP with the dark-field microscopy, a new ultrafast phase imaging technique (pCUP) is provided that is capable of capturing 350 phase images at a frame rate of 1 Tfps in a single-shot with a 2.5 mrad noise equivalent phase sensitivity. The combination of the frame rate and the sequence depth breaks the limits presented by previous methods and brings a new opportunity for real-time single-shot imaging of ultrafast phase signals. Several of its applications are demonstrated herein, including imaging the phase changes induced by the optical Kerr effect in a crystal and the detection of laser-induced shockwave propagation in water. By capturing these events in a single shot with a large sequence depth, pCUP brings a new opportunity to view ultrafast, unrepeatable events that have no contrast for intensity-based ultrafast imaging. Moreover, by adjusting the streak speed and the input optics, pCUP can easily be scaled in both space and time and can span over a large range, from micrometers to meters, and from picoseconds to milliseconds.

pCUP has broad application in various areas of fundamental and applied sciences, where the observations have been limited by the imaging speed of conventional methods. The images of the optical Kerr effect and the shockwave propagation, demonstrate that pCUP can be used for studying non-linear and ultrafast optics, fluids, and shock-matter interactions. Moreover, pCUP can be used for more complex applications including, but not limited to, detecting the shockwave propagation in inertial confinement fusion, monitoring of the shockwave-assisted drug delivery, and imaging and modeling of the cellular action potential propagation. Additional applications of pCUP systems and methods include imaging morphology changes in the microstructure of materials as those materials as being processed by a laser and imaging flame front propagation in a combustion chamber (as temperature is known to induce phase contrast). Examples of detecting the shockwave propagation in inertial confinement fusion, which are hereby incorporated by reference in their entireties, are described by Bradley, D. K. et al., "High-speed gated x-ray imaging for ICF target experiments (invited)," *Review of Scientific Instruments* 63, 4813-4817 (1992) and Kodama, R. et al., "Fast heating of ultra-high-density plasma as a step towards laser fusion ignition," *Nature* 412, 798 (2001). An example of monitoring the shockwave-assisted drug delivery is described by Jagadeesh, G. et al., "Needleless vaccine delivery using micro-shock waves" *Clinical and vaccine immunology: CVI* 18, 539-545 (2011), which is hereby incorporated by reference in its entirety.

A. Imaging System & Speed

Designing the pCUP system 100 involves balancing (e.g., optimizing) four variables in the system, namely, the imaging speed, the signal-to-background ratio (SBR), the signal-to-noise ratio (SNR), and the spatial resolution. The imaging speed is determined mainly by the sweeping speed of the streak camera. The sweeping speed is sometimes referred to as the related time range (e.g., at a given sweeping speed, it takes a given time range to complete a full sweep). In order to capture the transient event in a single shot, the time range is selected to match the total time of the event within the field of view. In other words, the time range is determined by the field of view divided by the propagation speed of the signal, in order to capture the entire event within the field of view in a single shot. Moreover, the imaging pulse is also adjusted to approximately match the time range, because the effective exposure time for each reconstructed frame, which is as short as 1 ps in 1 Tfps imaging, requires the imaging beam to come from a high-power ultrafast laser to achieve sufficient SNR for successful reconstruction of the time sequence.

Moreover, the size of the beam block in the dark-field microscope can be selected to maximize (e.g., optimized) the SNR and the SBR. With the CUP subsystem enclosed to block any light from entering the system except for the imaging light, the main source of noise in the system was the photon shot noise and the background leaked from the beam block. To ensure complete blockage of the unscattered light, the optimal size of the block was determined experimentally by maximizing the SNR and the SBR of the dark-field image captured by the CMOS camera 142. Additional discussion of beam block size optimizes is presented below. By completely blocking the unscattered light, the beam block also minimizes the background fluctuation associated with the unscattered light and provides optimized signals for CUP imaging.

Lastly, the spatial resolution is determined by the numerical aperture of the objective lens used, and the binning size of the pseudo-random DMD pattern loaded into DMD 150f. We used 3×3 binning in the imaging operations of FIGS. 2A, 2B, 3A, 3B, 4A, and 5B, which was the smallest bin size that allowed for robust image reconstruction.

B. Sample Preparation

Preparation of the sample 110 as part of imaging the 50 nm silicon dioxide beads (e.g., FIGS. 2A and 2B) involved obtaining $SiO_2$ beads in water (SISN50-25 N, from Nanocomposix, Inc.). A droplet of the $SiO_2$ solution was applied and spread on a glass coverslip (48393-048, from VWR International) and dried until the water was completely evaporated. A droplet of the immersion oil (IMMOIL-F30CC, from Olympus) was then applied on the coverslip and covered with another coverslip to spread the oil and to ensure uniform thickness over the field of view.

Preparation of the sample 110 as part of imaging the optical Kerr effect (e.g., FIGS. 3A and 3B) involved obtaining a BGO crystal (BGO12b101005S2, from MTI Corp.) of size 10×10×0.5 $mm^3$ and with two opposing faces polished. The four thin sides were further polished using a series of fiber polishing papers. The order of grit sizes used was 30 μm (LF30D, from Thorlabs), 6 μm (LF6D, from Thorlabs), 3 μm (LF3D, from Thorlabs), 1 μm (LF1D, from Thorlabs), and 0.02 μm (LFCF, from Thorlabs). The polishing was performed in order to maximize the transmission efficiency of the Kerr pump pulse (e.g., pump pulse 121) at the interface of air and the BGO crystal. The crystal was fixed on a mount (54996, manufactured by Edmund Optics) to ensure a clear aperture along the imaging light path (e.g., the path of imaging pulse 115) and a clear aperture along the pump light path (e.g., the path of pump pulse 121). The fluorescence light from the BGO crystal, which has a peak at 480 nm, was filtered out from the imaging beam path using a 450 nm short pass filter (47286, from Edmund Optics).

Preparation of the sample 110 as part of imaging laser-induced shockwave propagation in water (e.g., FIGS. 4A and 4B) involved filling a glass cuvette (1G10P, from FireflySci, Inc.) with type 1 ultrapure water obtained from a UV water purification system (Millipore Simplicity® UV) in order to remove impurities. The filled glass cuvette was placed on a sample holder located at the sample plane of the dark-field imaging subsystem, and then the shockwave was generated by coupling a 10 ps, 1064 nm pulsed laser (e.g., light source 130) through the objective lens using a short pass dichroic mirror 138 (DMSP805R, from Thorlabs).

C. Image Reconstruction

Reconstructing the sequence images from the raw output of streak camera 160 and CMOS camera 142 utilizes the lossless encoding setup with space and intensity constraints. Examples of CUP image reconstruction, which are hereby incorporated by reference in their entireties, are described by Zhu, L. et al., "Space- and intensity-constrained reconstruction for compressed ultrafast photography," *Optica* 3, 694-697 (2016) and Liang, J. et al., "Single-shot real-time video recording of a photonic Mach cone induced by a scattered light pulse," *Science Advances* 3, e1601814 (2017). The inputs of the reconstruction include the raw CUP image (from streak camera 160), the pattern image (e.g., the pseudo-random pattern applied by the DMD 150), the time-unsheared image captured on the external CMOS 142, the mask image derived from the time-unsheared image, and the transformation matrices between the two time-sheared views and the view from CMOS 142. The reconstruction algorithm was written in C++ and MATLAB and was run on a server equipped with Intel Xeon E5-2670 v3 CPU (48 cores at 2.3 GHz) and 256GB RAM. On this system, the reconstruction of a single data cube of size 672×512×350 pixels took about 15 minutes for 50 iterations. Lastly, for the shockwave experiment, the 180° rotation between the two time-sheared views was also implemented in the forward and the backward operator of the reconstruction code in order to compensate for the change in the optical setup.

D. Signal-to-Background Ratio (SBR) and Signal-to-Noise Ratio (SNR) as a Function of Beam Block Size In pCUP, it is helpful to minimize the background of the dark-field image because any background will overlap with the phase signal in time-sheared raw images and reduce the contrast. Therefore, the beam block diameter should generally be optimized to maximize SBR and SNR in the dark-field images. In practice, the beam block size is greater than the theoretical focal point size, because of the imperfect incident plane wave and the aberrations in the imaging system.

Figure 5:
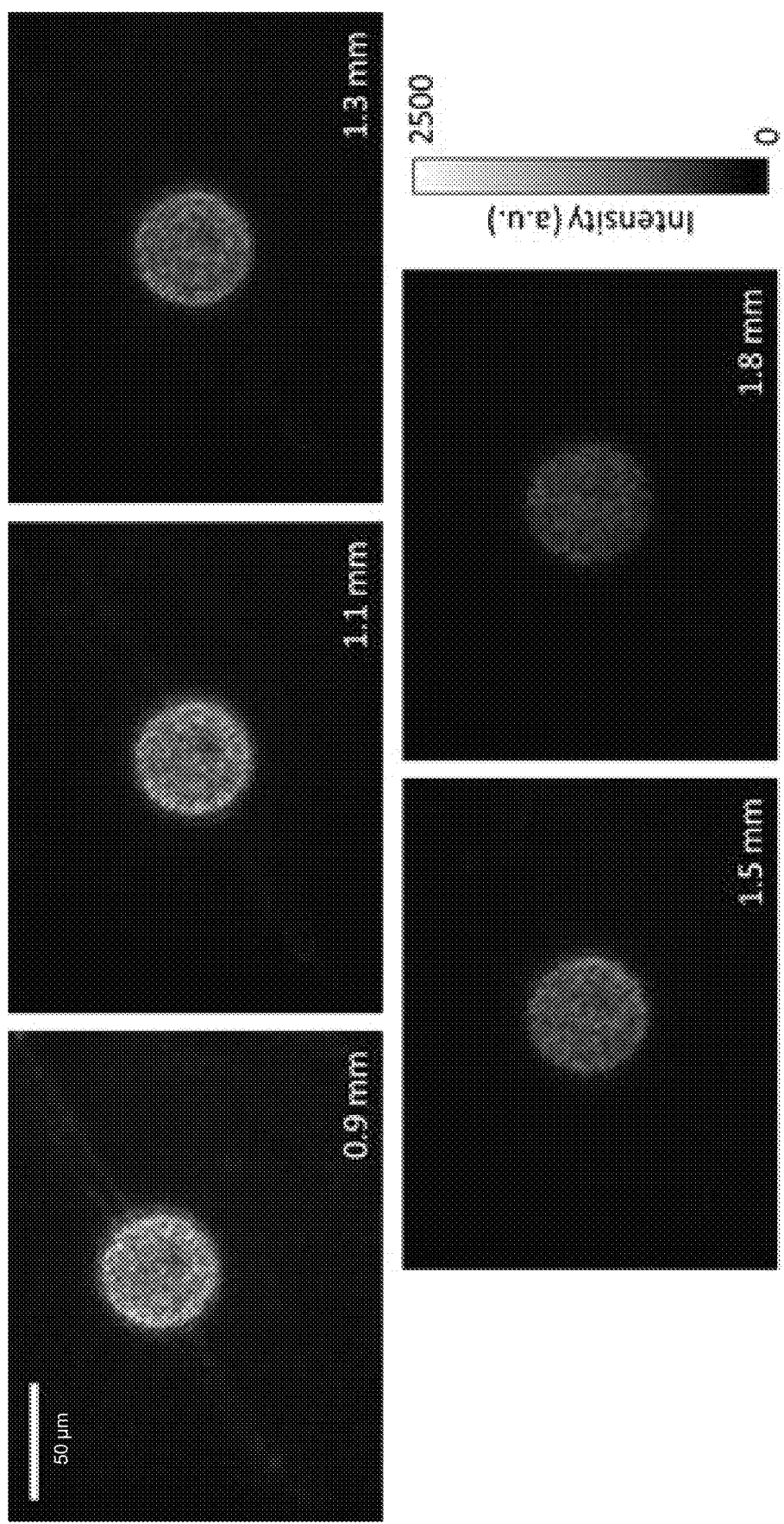
FIG. 5 are dark-field images of a 50 µm polystyrene bead in water with various beam block diameters, according to an aspect.

In order to optimize the SBR and the SNR, a 50-μm-diameter polystyrene bead in water was imaged for various beam block sizes. FIG. 5 shows five images of the same field of view, imaged with beam block diameters varying from 0.9 mm to 1.8 mm. As the beam block diameter becomes larger, not only does the background intensity reduce, but also the signal intensity from the bead reduces.

Table 1 shows the SBR and SNR measured with each beam block. The SBR was measured by dividing the average signal inside the bead by the average signal of the background. The SNR was measured by dividing the average signal inside the bead by the standard deviation inside the bead. For the pCUP system 100 using a 20× objective lens 108, the beam block with a 1.1 mm diameter provided the highest SBR and SNR. For the configuration (including a 1× objective lens 108) used for the Kerr effect measurement, the beam block with a 1.8 mm diameter was used.

TABLE 1

| Diameter (mm) | SBR | SNR |
| --- | --- | --- |
| 0.9 | 5.79 | 8.86 |
| 1.1 | 6.70 | 13.4 |
| 1.3 | 5.06 | 10.5 |
| 1.5 | 5.04 | 9.84 |
| 1.8 | 3.82 | 7.38 |

E. Improved Lossless Encoding Using Dove Prisms

As shown in FIG. 1, two dove prisms 152a and 152b are included in the CUP subsystem. The dove prisms further improve the encoding and reconstruction. By adding the dove prisms, the two complementary views experience shearing in opposite directions. This modification improves the reconstruction of the subjects being imaged including, but not limited to, the expanding shockwave, by allowing for a reduced overlap of the phase signals in the complementary views.

Figure 6:
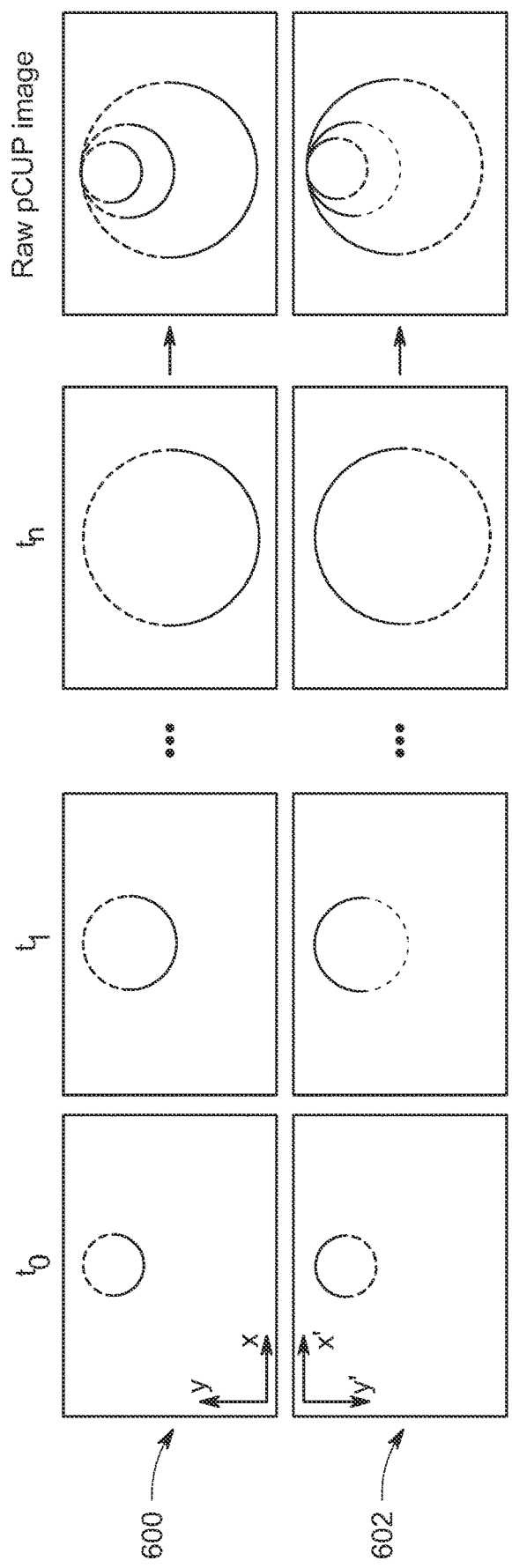
FIG. 6 illustrates raw image formation in a CUP system with 180° rotated complementary views, according to an aspect.

FIG. 6 illustrates the raw pCUP image formation for upright and 180° rotated complementary views. In particular, FIG. 6 illustrates the non-integrated image frames received by the imager within streak camera 160 at various points in time as well as the final integrated raw image. The raw pCUP image is a summation of all frames with a time dependent shearing along the y-axis.

In the context of imaging the shockwave as in FIGS. 4A and 4B, the radius of the shockwave increases with each successive frame (because of expansion of the shockwave over time) and the center of the shockwave moves downwards (because of the increasing shearing along the y-axis over time). As a result, the phase signal from the top half of the shockwave experiences spatial overlap in the raw image, while the bottom half of the shockwave is spread out in the raw image. Therefore, the top half of the shockwave is less sparse for reconstruction.

An example of the phase signal from the top half of the shockwave experiencing spatial overlap in the raw image while the bottom half is spread out is illustrated in FIG. 6 by image series 600. In FIG. 6, the top-half of the shockwave is illustrated with a dashed arc, while the bottom-half of the shockwave is illustrated with a solid arc. As seen in image series 600, there is significant spatial overlap of the top half of the shockwave between successive frames and thus in the raw pCUP image (e.g., the integrated image), while the bottom half of the shockwave is spread out in the raw image. This overlap in the top-half of the shockwave complicates image reconstruction.

Without the dove prisms 152a and 152b, both of the complementary views, sheared in the same direction, would lack sparsity in the top half of the shockwave. By adding the dove prisms to rotate the second view 180° while matching the path lengths, the bottom half of the shockwave is located at the top of the image in the second view (e.g., in image series 602). Therefore, the raw image from the second view shows an overlapped bottom half of the shockwave and a spread top half of the shockwave. This rotated second view reduces the reconstruction ambiguity in the top half of the shockwave and allows for a more robust reconstruction of the shockwave.

VII. Additional Considerations

Modifications, additions, or omissions may be made to any of the above-described embodiments without departing from the scope of the disclosure. Any of the embodiments described above may include more, fewer, or other features without departing from the scope of the disclosure. Additionally, the steps of described features may be performed in any suitable order without departing from the scope of the disclosure. Also, one or more features from any embodiment may be combined with one or more features of any other embodiment without departing from the scope of the disclosure. The components of any embodiment may be integrated or separated according to particular needs without departing from the scope of the disclosure. For example, it would understood that while certain PACT systems are described herein with a linear stage, another mechanism may be used.

It should be understood that certain aspects described above can be implemented in the form of logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code using any suitable computer language and/or computational software such as, for example, Java, C, C#, C++ or Python, LabVIEW, Mathematica, or other suitable language/computational software, including low level code, including code written for field programmable gate arrays, for example in VHDL. The code may include software libraries for functions like data acquisition and control, motion control, image acquisition and display, etc. Some or all of the code may also run on a personal computer, single board computer, embedded controller, microcontroller, digital signal processor, field programmable gate array and/or any combination thereof or any similar computation device and/or logic device(s). The software code may be stored as a series of instructions, or commands on a CRM such as a random access memory (RAM), a read only memory (ROM), a magnetic medium such as a hard-drive or a floppy disk, or an optical medium such as a CD-ROM, or solid stage storage such as a solid state hard drive or removable flash memory device or any suitable storage device. Any such CRM may reside on or within a single computational apparatus, and may be present on or within different computational apparatuses within a system or network. Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

What is claimed is:

1. A phase-sensitive compressed ultrafast photography (pCUP) system for obtaining a series of final recorded images of a subject, comprising:
    a dark-field imaging system, the dark-field imaging system comprising:
        a laser source configured to illuminate the subject with at least a first laser pulse for an imaging duration; and
        a beam block configured to pass laser light scattered by the subject upon illumination by the first laser pulse as a first series of phase images and block laser light not scattered by the subject; and
    a compressed ultrafast photography (CUP) system configured to receive the laser light scattered by the subject and passed by the beam block, the CUP system comprising:
        a spatial encoding module configured to receive the first series of phase images and to produce a second series of spatially encoded phase images, each spatially encoded phase image of the second series comprising at least a first view including one phase image of the first series of phase images superimposed with a pseudo-random binary spatial pattern; and
        a streak camera coupled to the spatial encoding module, the streak camera configured to receive the second series of spatially encoded phase images, to deflect each spatially encoded phase image by a temporal deflection distance that varies as a function of time-of-arrival, and to integrate the deflected phase images into a single raw CUP image.

2. The pCUP system of claim 1, wherein the CUP system further comprises:
    an optical component configured to divide the laser light scattered by the subject and passed by the beam block into first and second fractions, the first fraction being conveyed to the spatial encoding module; and
    an additional camera configured to receive the second fraction of the laser light scattered by the subject and passed by the beam block, the second additional camera configured to temporally integrate the first series of phase images into an additional raw image.

3. The pCUP system of claim 2, wherein the optical component comprises a beam splitter.

4. The pCUP system of claim 1, each spatially encoded phase image of the second series further comprises a second view including the one phase image of the first series superimposed with a complementary pseudo-random binary spatial pattern.

5. The pCUP system of claim 4, wherein the first view and the second view are positioned in spatially separate regions of a field of view of the streak camera.

6. The pCUP system of claim 4, wherein the CUP system further comprises:

at least one optical component configured to transform the first view and/or the second view such that the first view is rotated 180° relative to the second view prior to the streak camera.

7. The pCUP system of claim 4, wherein the spatial encoding module comprises a digital micromirror device comprising an array of micromirrors, each micromirror configured to reflect a portion of the phase images of the first series at a first reflection angle or at a second reflection angle according to the pseudo-random binary spatial pattern.

8. The pCUP system of claim 7, wherein the first view comprises all portions of the phase images of the first series reflected at the first reflection angle and wherein the second view comprises all portions of the phase images of the first series reflected at the second reflection angle.

9. The pCUP system of claim 1, wherein the streak camera comprises an entrance slit configured in a fully open position.

10. The pCUP system of claim 1, wherein the series of final recorded images are obtained with a frame rate of at least 1 trillion frames per second from a single event.

\* \* \* \* \*